United States Patent
Notohamiprodjo et al.

(10) Patent No.: US 12,401,214 B2
(45) Date of Patent: *Aug. 26, 2025

(54) CONFIGURABLE INTEGRATED POWER DELIVERY MODULE WITH ADAPTIVE POWER SHARING

(71) Applicant: Silanna Asia Pte Ltd, Singapore (SG)

(72) Inventors: Hubertus Notohamiprodjo, Union City, CA (US); Timothy Wilhelm, Harpswell, ME (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,191

(22) Filed: May 14, 2024

(65) Prior Publication Data
US 2024/0305120 A1    Sep. 12, 2024

Related U.S. Application Data

(63) Continuation of application No. 18/337,928, filed on Jun. 20, 2023, now Pat. No. 12,015,298.

(60) Provisional application No. 63/368,448, filed on Jul. 14, 2022.

(51) Int. Cl.
| | |
|---|---|
| *H01M 10/46* | (2006.01) |
| *H02J 7/00* | (2006.01) |
| *H02J 7/04* | (2006.01) |
| *H02M 3/158* | (2006.01) |

(52) U.S. Cl.
CPC ........ *H02J 7/00712* (2020.01); *H02J 7/0047* (2013.01); *H02J 7/04* (2013.01); *H02M 3/158* (2013.01); *H02J 2207/20* (2020.01)

(58) Field of Classification Search
CPC ........ H02J 7/0047; H02J 7/00712; H02J 7/04; H02J 2207/20; G06F 1/206; G06F 1/3215; G06F 1/3296; H02M 1/007; H02M 1/008
USPC .......... 320/107, 134, 137, 140, 150
See application file for complete search history.

(56) References Cited

U.S. PATENT DOCUMENTS

| | | |
|---|---|---|
| 12,015,298 B2 * | 6/2024 | Notohamiprodjo ....... G06F 1/24 |
| 2013/0238920 A1 | 9/2013 | Harris |
| 2018/0120910 A1 | 5/2018 | Farkas et al. |
| 2019/0033953 A1 | 1/2019 | Kadgi et al. |
| 2020/0012326 A1 | 1/2020 | Steele et al. |
| 2020/0257345 A1 | 8/2020 | Wang et al. |
| 2021/0351716 A1 | 11/2021 | Richards et al. |
| 2022/0113776 A1 | 4/2022 | Bhagavathula et al. |
| 2022/0137688 A1 | 5/2022 | Wang et al. |

FOREIGN PATENT DOCUMENTS

| | | |
|---|---|---|
| CN | 107562168 A | 1/2018 |
| CN | 208461525 U | 2/2019 |
| CN | 111628537 A | 9/2020 |

OTHER PUBLICATIONS

International Search Report and Written Opinion dated Sep. 25, 2023 for PCT Patent Application No. PCT/IB2023/056393.
Notice of Allowance and Fees dated Feb. 12, 2024 for U.S. Appl. No. 18/337,928.
Office Action dated Dec. 6, 2023 for U.S. Appl. No. 18/337,928.

* cited by examiner

*Primary Examiner* — Edward Tso
(74) *Attorney, Agent, or Firm* — MLO, a professional corp.

(57) ABSTRACT

A multi-port charger includes two or more integrated power delivery modules electrically coupled to an AC-to-DC power converter. Each of the integrated power delivery modules includes a module controller in signal communication with a digital communication bus, a USB-PD controller, a switch-mode DC-to-DC power converter which is configured to provide an adjustable output voltage to a sink device via a USB voltage bus, a first analog-to-digital converter (ADC) circuit in signal communication with the USB-PD controller and the USB voltage bus to generate a digital representation of the output voltage, and a second ADC circuit in signal communication with the USB-PD controller and the USB voltage bus to provide a digital representation of an output current provided by the switch-mode DC-to-DC power converter to the sink device.

20 Claims, 18 Drawing Sheets

From 516 (Disconnection Detected)

↓

Set $P_{available}$ to $P_{available} + P_{alloc}^p$ —1102

↓

Set $P_{alloc}^p$ to 0 W —1104

↓

Set max current at port p to 1.5 A if Type-C —1106

↓

Clear $Temp^p$ and any other flags and counters for port p —1108

↓

Unmask capability mismatch for ports other than port p —1110

↓

Place DC/DC converter in low-power mode —1112

↓

To 506

1400

1500

1700

CONFIGURABLE INTEGRATED POWER DELIVERY MODULE WITH ADAPTIVE POWER SHARING

RELATED APPLICATIONS

This application is a continuation of U.S. patent application Ser. No. 18/337,928, filed Jun. 20, 2023, which claims priority to U.S. Provisional Patent Application No. 63/368,448, filed Jul. 14, 2022, all of which is incorporated herein by reference in its entirety for all purposes.

BACKGROUND

Many mobile devices, such as cell phones, laptop computers, tablet computers, and similar, are shipped from their respective manufacturer with a single charger. Such chargers typically receive AC power and produce a DC power output on a single port in accordance with the USB-PD (USB Power Delivery) industry standard. However, some consumers may wish to have a multi-port charger that can supply a DC power output to more than one upward-facing port device ("sink device") at a time. For example, such consumers may desire a multi-port charger that is operable to charge their cell phone and wireless headphones simultaneously. However, multi-port chargers often must adhere to strict maximum power output limits (e.g., 45 W) as a function of charger spatial volume to limit a maximum temperature thereof. Therefore, even if a manufacturer includes two entirely separate charger circuits within a single package to implement a multi-port charger, as is conventionally done, each of those charger circuits must be power limited to provide only a fixed fraction of the total maximum power output limit. For example, two charger circuits in a single package would be limited by the manufacturer to only provide half of a total maximum power output limit. As a result, sink devices plugged into such multi-port chargers will not charge as rapidly as compared to plugging each sink device into a discrete charger.

Additionally, existing multi-port chargers solutions that address some of the problems outlined herein conventionally do not provide substantial flexibility with regard to configurability or power-efficient modes of operation.

SUMMARY

In some embodiments, a multi-port charger includes an AC-to-DC power converter that receives an AC input voltage and generates a DC output voltage therefrom, and two or more integrated power delivery modules electrically coupled to the AC-to-DC power converter and in signal communication with a digital communication bus. Each of the integrated power delivery modules includes a module controller in signal communication with the digital communication bus, a USB-PD controller ("PD controller") in signal communication with the module controller and which is configured to be connected to a sink device adhering to a USB standard, a switch-mode DC-to-DC power converter in signal communication with the module controller and the PD controller and which is configured to provide an adjustable output voltage to the sink device via a USB voltage bus, a first analog-to-digital converter (ADC) circuit in signal communication with the PD controller and the USB voltage bus to generate a digital representation of the output voltage provided by the switch-mode DC-to-DC power converter to the sink device, and a second ADC circuit in signal communication with the PD controller and the USB voltage bus to provide a digital representation of an output current provided by the switch-mode DC-to-DC power converter to the sink device.

In some embodiments, an integrated power delivery module includes a module controller in signal communication with a digital communication bus, a USB-PD controller ("PD controller") in signal communication with the module controller and which is configured to be connected to a sink device adhering to a USB standard, a switch-mode DC-to-DC power converter in signal communication with the module controller and the PD controller and which is configured to receive an input voltage and to provide an adjustable output voltage to the sink device via a USB voltage bus, a first analog-to-digital converter (ADC) circuit in signal communication with the PD controller and the USB voltage bus to generate a digital representation of the output voltage provided by the switch-mode DC-to-DC power converter to the sink device, and a second ADC circuit in signal communication with the PD controller and the USB voltage bus to provide a digital representation of an output current provided by the switch-mode DC-to-DC power converter to the sink device.

BRIEF DESCRIPTION OF THE DRAWINGS

FIG. 5 through FIG. 17 provide a simplified example process for adaptive power-sharing using the multi-port charger shown in FIG. 2, in accordance with some embodiments.

DETAILED DESCRIPTION

Some consumers desire a multi-port charger that is operable to charge multiple sink devices simultaneously. However, many conventional multi-port charger implementations have limited (or zero) flexibility for making power contracts with sink devices based upon sink power requests and actual power consumption of the sink devices with respect to the available power of the multi-port charger. Therefore, even if a manufacturer includes two entirely separate charger circuits within a single package to implement a multi-port charger, which is conventionally done, each of those charger circuits must be power limited to provide only a fraction of the total maximum power output limit. Additionally, some conventional solutions that distribute power between multiple ports do so in a fixed, non-configurable, and/or coarse manner, which limits flexibility and power efficiency as compared to the techniques disclosed herein.

Disclosed herein is an integrated power delivery module that advantageously communicates with one or more other integrated power delivery modules of a multi-port charger. The integrated power deliver modules adaptively and continually control how much power is delivered to each port of the multi-port charger with high-granularity as power demands of the connected sink devices change over time based on calculated available power. The integrated power delivery modules adaptively and continually control how much power is delivered to each port of the multi-port charger in response to temperature changes, priority, battery charge levels, and other status events of the connected sink devices. The integrated power delivery modules are named as such because a USB-PD controller is integrated into the same package as a DC-to-DC power converter. They are operable to configure the DC-to-DC power converter therein into a low-power mode when no sink device is connected to the port associated with that integrated power delivery module.

Figure 1:
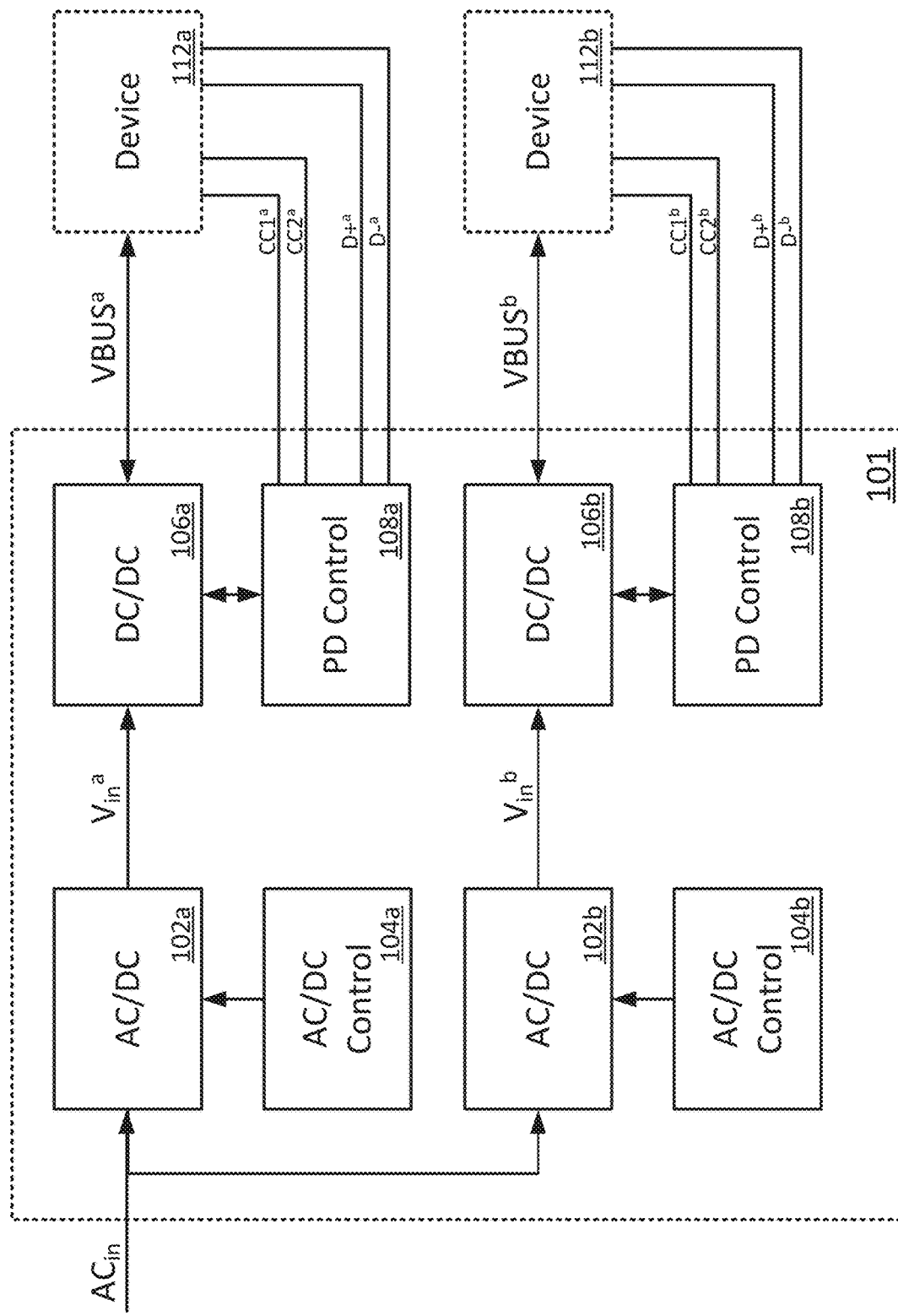
FIG. 1 is a simplified schematic of a prior-art multi-port charger.

FIG. 1 is a simplified schematic of a prior-art multi-port charger 101 that is connected to sink devices 112a-b (e.g., cell phones). The multi-port charger 101 includes two independent charger circuits. A first one of the independent charger circuits of the multi-port charger 101 includes an AC-to-DC ("AC/DC") power converter circuit 102a, an AC-to-DC power converter control circuit 104a, a DC-to-DC ("DC/DC") power converter circuit 106a, and a USB-PD control circuit ("PD control") 108a, connected as shown. A second one of the independent charger circuits of the multi-port charger 101 includes an AC-to-DC power converter circuit 102b, an AC-to-DC power converter control circuit 104b, a DC-to-DC power converter circuit 106b, and a USB-PD control circuit ("PD control") 108b, connected as shown. Each of the independent charger circuits of the multi-port charger 101 receives an AC voltage $AC_{in}$ and produces a respective DC voltage $Vin^a$ and $Vin^b$ therefrom. The DC-to-DC power converter circuits 106a and 106b respectively receive the DC voltages $Vin^a$ and $Vin^b$ and produce a respective USB bus voltage $VBUS^a$ and $VBUS^b$ therefrom. The USB-PD control circuit 108a produces signals $CC1^a$, $CC2^a$, $D+^a$, and $D-^a$, in accordance with the USB-PD standard. Similarly, the USB-PD control circuit 108b produces signals $CC1^b$, $CC2^b$, $D+^b$, and $D-^b$, in accordance with the USB-PD standard. As mentioned above, to comply with the maximum power limit of the multi-port charger 101, each of the independent charger circuits therein is conventionally power limited such that each only provides a fixed percentage of the maximum power limit.

Figure 2:
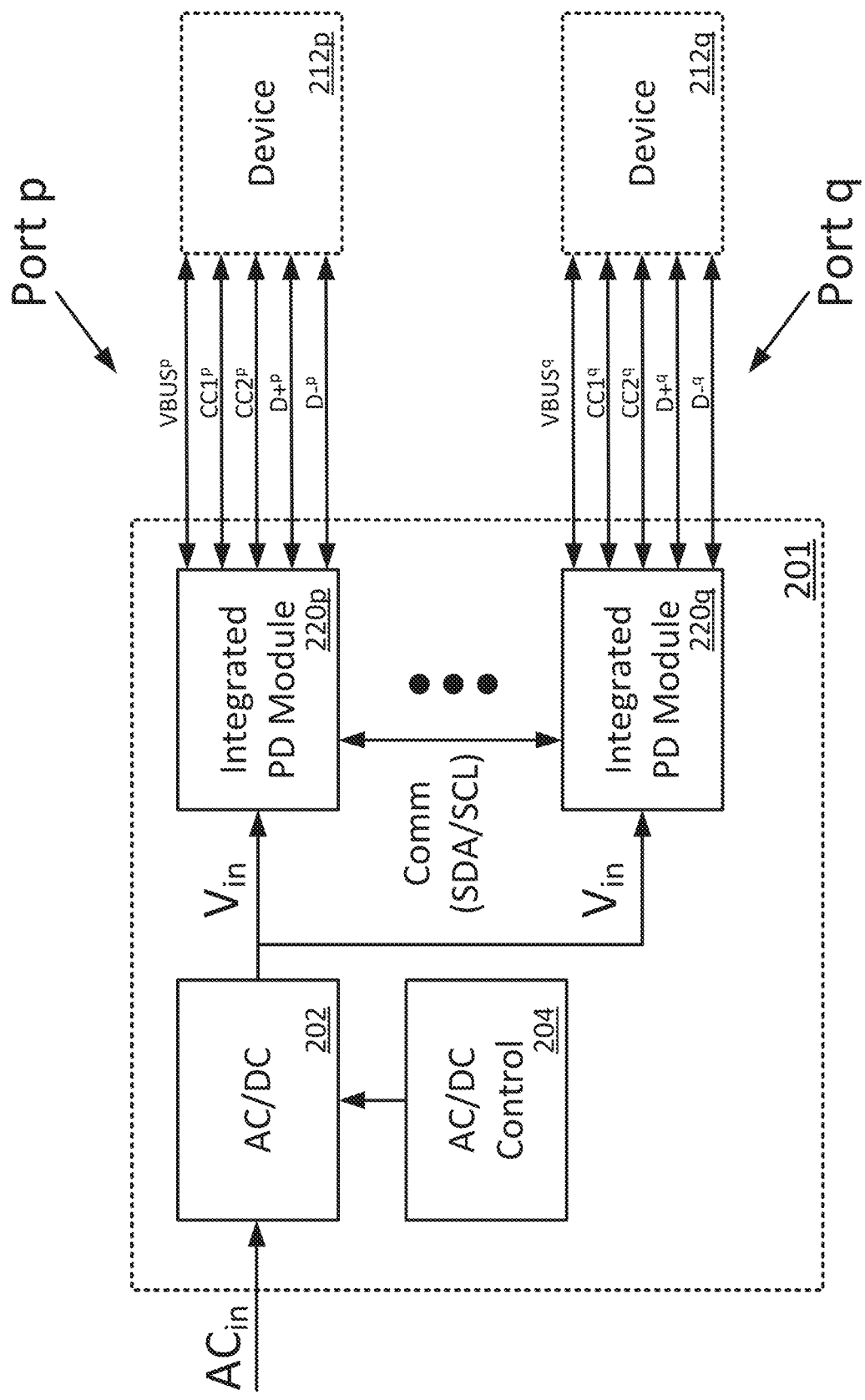
FIG. 2 is a simplified schematic of a multi-port charger with adaptive power sharing, in accordance with some embodiments.

FIG. 2 is a simplified schematic of a multi-port charger 201 with configurable and adaptive power-sharing that is connected to sink devices 212p-q (e.g., cell phones), in accordance with some embodiments. The multi-port charger 201 includes a single AC-to-DC ("AC/DC") power converter 202, a single AC-to-DC control circuit 204, and multiple integrated power delivery modules ("Integrated PD Module", or "IPD Module") 220p-q. Each port, p through q, of the multi-port charger 201 has a corresponding respective integrated PD module that includes a respective USB PD controller circuit, a respective module controller circuit, and a respective switch-mode DC-to-DC power converter, as described below.

The sink device 212p is electrically and communicatively coupled to port p of the multi-port charger 201 by the integrated PD module 220p. Similarly, the sink device 212q is electrically and communicatively coupled to port q of the multi-port charger 201 by the integrated PD module 220q. Some elements of the multi-port charger 201 have been omitted to simplify the description thereof but would be understood by one of ordinary skill in the art to be present.

As shown, the single AC-to-DC power converter 202 receives an AC input voltage $AC_{in}$ and produces a shared DC voltage rail Vin therefrom. Each of the integrated PD modules 220p through 220q receives the DC voltage Vin and respectively produces a USB bus voltage $VBUS^p$ through $VBUS^q$ therefrom using an integrated switch-mode DC-to-DC power converter circuit. The integrated PD module 220p produces signals $CC1^p$, $CC2^p$, $D+^p$, and $D-^p$ at port p, in accordance with the USB-PD standard. Similarly, the integrated PD module 220q produces signals $CC1^q$, $CC2^q$, $D+^q$, and $D-^q$, in accordance with the USB-PD standard. As shown by a line therebetween, the integrated PD module 220p and the integrated PD module 220q are advantageous communicatively coupled to each other via a digital communication bus "Comm (SDA/SCL)" (e.g., a serial or parallel data bus, such as a data bus that adheres to the I2C or SPI standard). Because the integrated PD module 220p and the integrated PD module 220q are communicatively coupled to each other, the integrated PD modules 220p-q are operable to communicate with one another to continually and adaptively update the amount of power delivered to each port of the multi-port charger 201 with fine control.

By comparison, some conventional distributed solutions either communicate an available amount of power using a shared analog bus having fixed resistor values or may communicate with a single power delivery coordination circuit. Such conventional solutions lack the flexibility, configurability, and granularity of control as compared to the integrated PD modules disclosed herein. For example, some conventional multi-port chargers may be operable to distribute a fixed amount of power between multiple sink devices, but may not be able to adjust how much power a first sink device is receiving based on changing device priorities and/or the status of two or more second sink devices connected to the multi-port charger.

Figure 3:
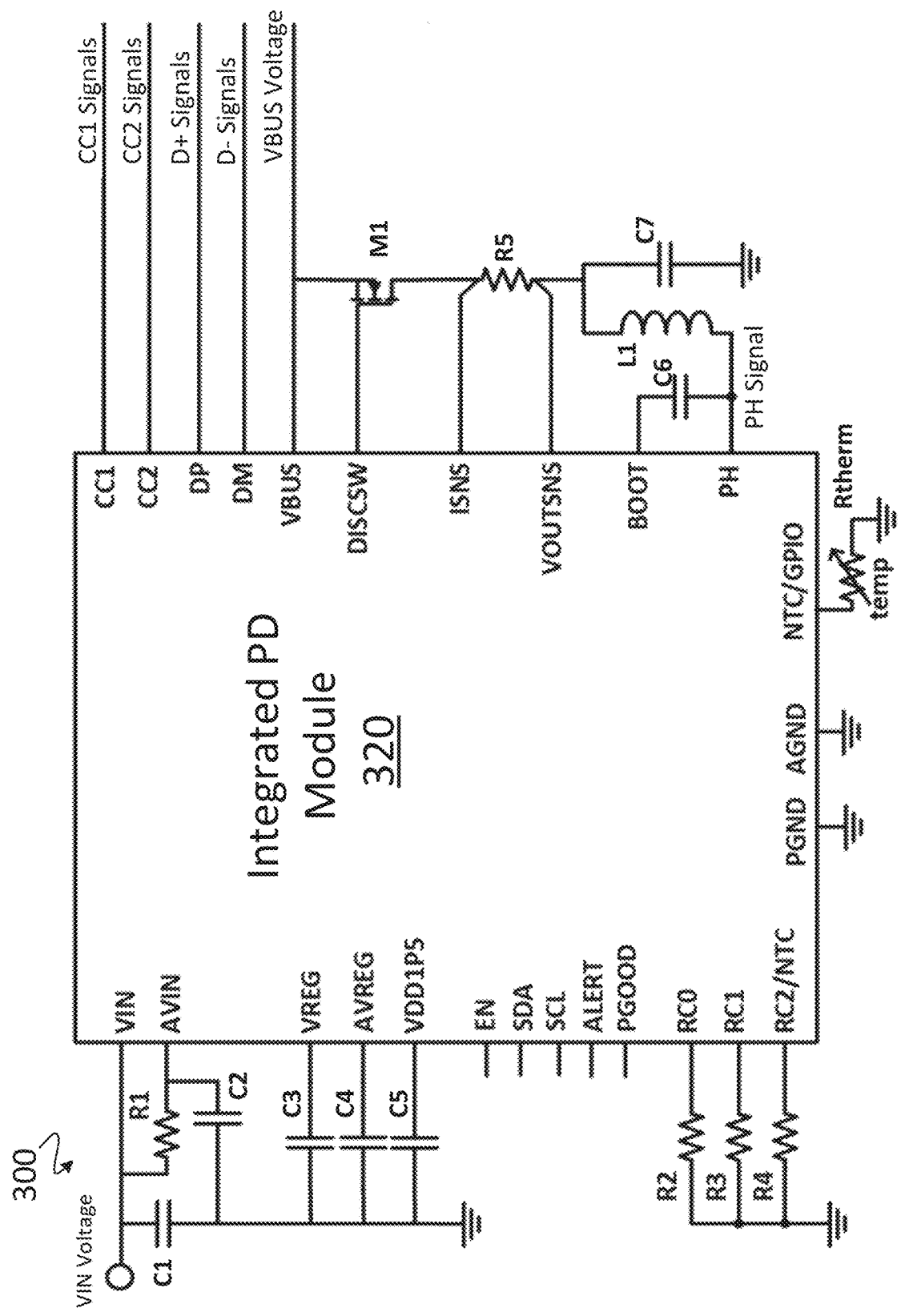
FIG. 3 is a simplified schematic of a circuit that includes a configurable integrated power delivery module of the multi-port charger shown in FIG. 2, in accordance with some embodiments.

FIG. 3 is a simplified schematic of a circuit 300 that includes an integrated PD module 320 that is similar to the integrated PD modules 220p-q of the multi-port charger 201 shown in FIG. 2, in accordance with some embodiments. The circuit 300 generally includes the integrated PD module 320, resistors R1-R5, capacitors C1-C7, a switch M1, an inductor L1, and thermistor Rtherm. Also shown are signal nodes of the circuit 300, which include signal and voltage nodes designated as VIN, AVIN, VREG, AVREG, VDD1P5, EN, SDA, SCL, ALERT, PGOOD, RCO, RC1, RC2/NTC, CC1, CC2, DP, DM, VBUS, DISCSW, ISNS, VOUTSNS, BOOT, PH, PGND, AGND, and NTC/GPIO. Description of some of the nodes shown in FIG. 3 are omitted herein for brevity.

Figure 4A:
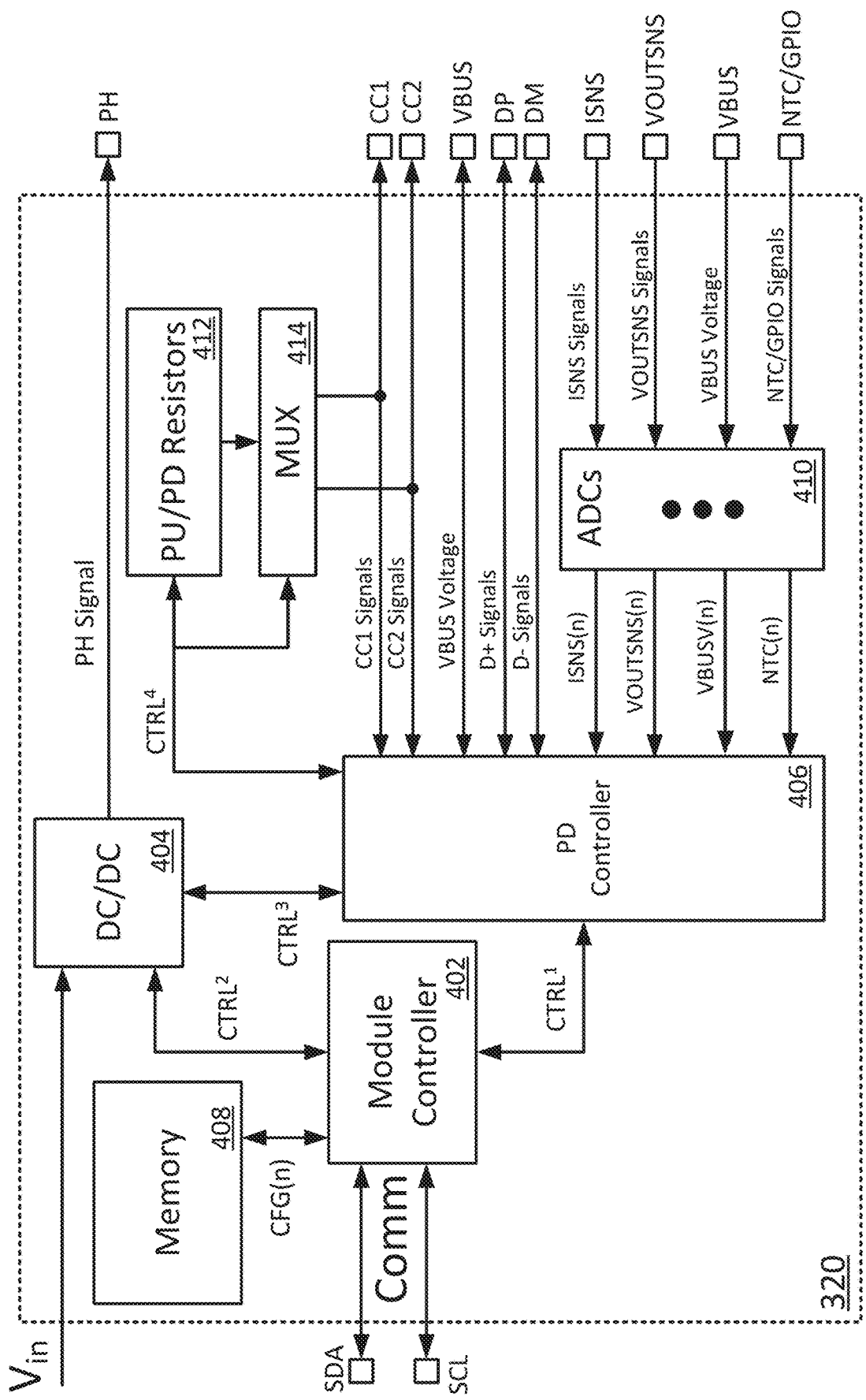
FIG. 4A is a simplified schematic of a circuit providing select details of the configurable integrated power delivery module included in the circuit shown in FIG. 3, in accordance with some embodiments.

The nodes designated CC1 and CC2 are part of a configuration and communication channel for USB-PD communication with a sink device, the nodes designated DP and DM comprise a communication channel for USB-PD fast charging communication with a sink device, and the node designated VBUS of a USB voltage bus provides an output voltage to a sink device as well as serving as voltage sense line, as shown in FIG. 4A. The node designated as PH is a phase switch node for a switch-mode DC-to-DC power converter that is advantageously internal to the circuit 300 as described below. The inductor L1 and the capacitor C7 provide an output filter stage of the internal switch-mode DC-to-DC power converter.

The nodes RCO, RC1, and RC2/NTC are resistor configuration nodes used to set operational parameters of the integrated PD module 320, which are described in more detail below. The node NTC/GPIO is operable to be connected to a temperature sensing circuit (e.g., a thermistor) to provide a temperature measurement of, or near to, the integrated PD module 320.

Also shown are signals designated as CC1 Signals, CC2 Signals, D+ Signals, D− Signals, a VIN Voltage, a VBUS Voltage, and a PH Signal. Some elements and signals of the circuit 300 have been omitted to simplify the description thereof but would be understood by one of ordinary skill in the art to be present. Details of the integrated PD module 320 are described below.

FIG. 4A is a simplified schematic of a portion of the integrated power delivery module 320 shown in FIG. 3, in accordance with some embodiments. As shown, the integrated power delivery (PD) module 320 generally includes a module controller 402 (e.g., implemented using a microcontroller, a microprocessor, an FPGA, and/or an ASIC), a switch-mode DC-to-DC ("DC/DC") power converter 404 (e.g., implemented as a switched buck-mode converter utilizing eternal components L1 and C7), a USB-PD Controller ("PD controller") 406 to provide an adjustable DC output voltage, one or more volatile and/or non-volatile memory blocks 408 which may be part of the module controller 402 and/or the PD controller 406 or may be one or more separate modules, multiple analog-to-digital ("ADC") converter circuits 410, programmatically controlled termination (Pull-up/Pull-down) resistors (e.g. Rp) ("PU/PD Resistors") 412, and a signal multiplexing circuit ("MUX") 414, connected as shown. Some elements of the integrated PD module 320 have been omitted to simplify the description thereof but would be understood by one of ordinary skill in the art to be present. Also shown are control signals $CTRL^{1-4}$, a configuration signal CFG(n), the previously introduced USB protocol signals designated as CC1 Signals, CC2 Signals, VBUS Voltage, D+ Signals, D− Signals, analog current sense ISNS signals, analog voltage sense VOUTSNS signals, an analog USB bus voltage sense signal VBUS Voltage, analog temperature measurement sense NTC/GPIO Signals, a digital representation of the analog current sense signal ISNS(n), a digital representation of the analog voltage sense signal VOUTSNS(n), a digital representation of the USB bus voltage VBUSV(n), a digital representation of an analog temperature measurement signal NTC(n), the phase node signal PH from the DC-to-DC power converter circuit 404, and communication signals SDA/SCL of a digital communication bus designated as Comm. Also shown are previously introduced nodes SDA, SCL, PH, VBUS, CC1, CC2, DP, DM, ISNS, VOUTSNS, and NTC/GPIO.

The memory block 408 is advantageously operable to store programmable (e.g., from an external interface, not shown) configurations of the integrated PD module 320, such as a maximum or total allowable power that can be delivered by the integrated PD module 320. The module controller 402 is operable to retrieve the programmable configurations from the memory block 408 via the configuration signal CFG(n) and to control the PD controller 406 and the DC-to-DC power converter circuit 404 in accordance with the retrieved programmable configurations. The module controller 402 is also operable to communicate with respective module controllers of other integrated power delivery modules of a multi-port charger, e.g., using communication signals SDA/SCL over the digital communication bus Comm, to continually and adaptively control how much power may be provided to a connected sink device by each integrated PD module 320. The module controller 402 advantageously enables each integrated PD module 320 of a multi-port charger to be configured to precisely deliver a desired amount of power to a connected sink device.

The ADC circuit 410 includes multiple ADC circuits, or one or more multiplexed ADC circuits, and is operable to receive analog signals and to create digital representations thereof. As shown, the ADC circuit 410 receives an analog current sense signal ISNS, an analog output voltage sense signal VOUTSNS, an analog VBUS voltage, and an analog temperature sense signal NTC/GPIO. The ADC circuit 410 uses the aforementioned received analog signals to create respective digital representations ISNS(n), VOUTSNS(n), VBUSV(n), and NTC(n).

The PD controller 406 is operable to use the respective digital representations for making USB control and policy decisions and is further operable to transmit the respective digital representations to the module controller 402. The module controller is operable to use the digital representations of the current sense signal ISNS(n) and the digital representation of the VBUS Voltage VBUSV(n) to calculate (e.g., by multiplying the values thereof) an actual amount of power that is being provided by the DC-to-DC power converter 404 to a sink device. Each PD controller 406 advantageously receives digital signals ISNS(s) and VBUSV(n) which are representative of sensed current and voltage, respectively, to manage power delivery to the sink device by controlling the DC-to-DC power converter 404 and/or the power contract established with the sink device.

The PD controller 406 includes modules (not shown) that implement the USB Power Delivery (PD) protocol to exchange commands and messages to negotiate and establish power contracts between each integrated PD module 320 and a sink device connected thereto, such as a mobile phone or notebook. The PD controller 406 communicates with the module controller 402 to advantageously coordinate and negotiate power distribution between other respective PD controllers 406. As shown in FIG. 4A, each PD controller 406 is operable to communicate with a sink device via the CC1, CC2, DP, and DM nodes.

Some sink devices require constant current and some sink devices require constant voltage. How much voltage and current is needed by a particular connected sink device is communicated by the PD controller 406 to the module controller 402, and the module controller 402 determines if the multi-port charger has enough available power remaining to deliver for that request. The module controller 402 communicates (e.g., periodically such as every 5 second, 10 seconds, 20 seconds, or another appropriate amount of time, or in response to an event) with module controllers of the other integrated PD controllers to determine the current status of total power already delivered and to calculate how much additional charger power remains available. The module controller 402 is further operable to continuously and optimally re-distribute power contracts to already connected sink devices of the multi-port charger based on changing priorities or status events of the connected sink devices. The module controller 402 and the PD controller 406 thereby advantageously manage power sharing and power allocation and power re-balancing for a multi-port charger to ensure that the total power delivered to all ports will not exceed the total power capacity of the multi-port charger.

The PD controller 406 is operable to generate an output voltage setpoint of the DC-to-DC power converter 404, using the control signal $CTRL^3$, such that the power provided to a sink device connected to the integrated PD module 320 is advantageously only slightly above, within some margin, to what the sink device requires, thereby increasing energy efficiency as compared to conventional solutions.

The PD controller 406 and module controller 402 of each of the integrated PD modules 320 are advantageously aware of all port statuses of the multi-port charger 201. Therefore, in some embodiments, the PD controller 406 and/or the module controller 402 are aware if no ports of the multi-port charger 201 are connected to sink devices and are operable to place each DC-to-DC power converter into a low-power standby mode.

In some embodiments, the module controller 402 manages power balancing to each port of the multi-port charger 201 in granular steps, such as 2 W per 10 seconds, and power balancing is advantageously performed without the need for port resets and/or re-established handshakes.

The module controller 402 also advantageously communicates to the DC-to-DC power converter 404 via control signal $CTRL^2$ when one or more sink devices of the multi-port charger are not USB-PD compliant but is instead a normal battery charger load. In such instances, the DC-to-DC power converter 404 is set by the module controller 402 to a fixed power initially and then updated periodically. For example, the DC-to-DC power converter 404 may increase the power delivered to a load by 2 W every 10 seconds if power is still available.

The PD controller 406 and/or the module controller 402 are advantageously operable to use the digital representations ISNS(n) and VBUSV(n) to continually and adaptively determine (e.g., by multiplying the values thereof) and control an actual amount power that is delivered by the integrated PD module 320 by communicating with other integrated power delivery modules of a multi-port charger circuit. By comparison, some conventional solutions may use a shared analog power line to determine how much power is being delivered by the combined conventional power delivery modules. As disclosed herein, by calculating, using the module controller 402, how much power is being delivered by a respective integrated PD module 320, the module controller has greater flexibility in being able to change operating modes based on user configurations and preferences. For example, based on which type of sink device is connected to a particular integrated PD module 320, the module controller 420 thereof may adaptively control maximum and minimum power delivery settings.

Figure 4B:
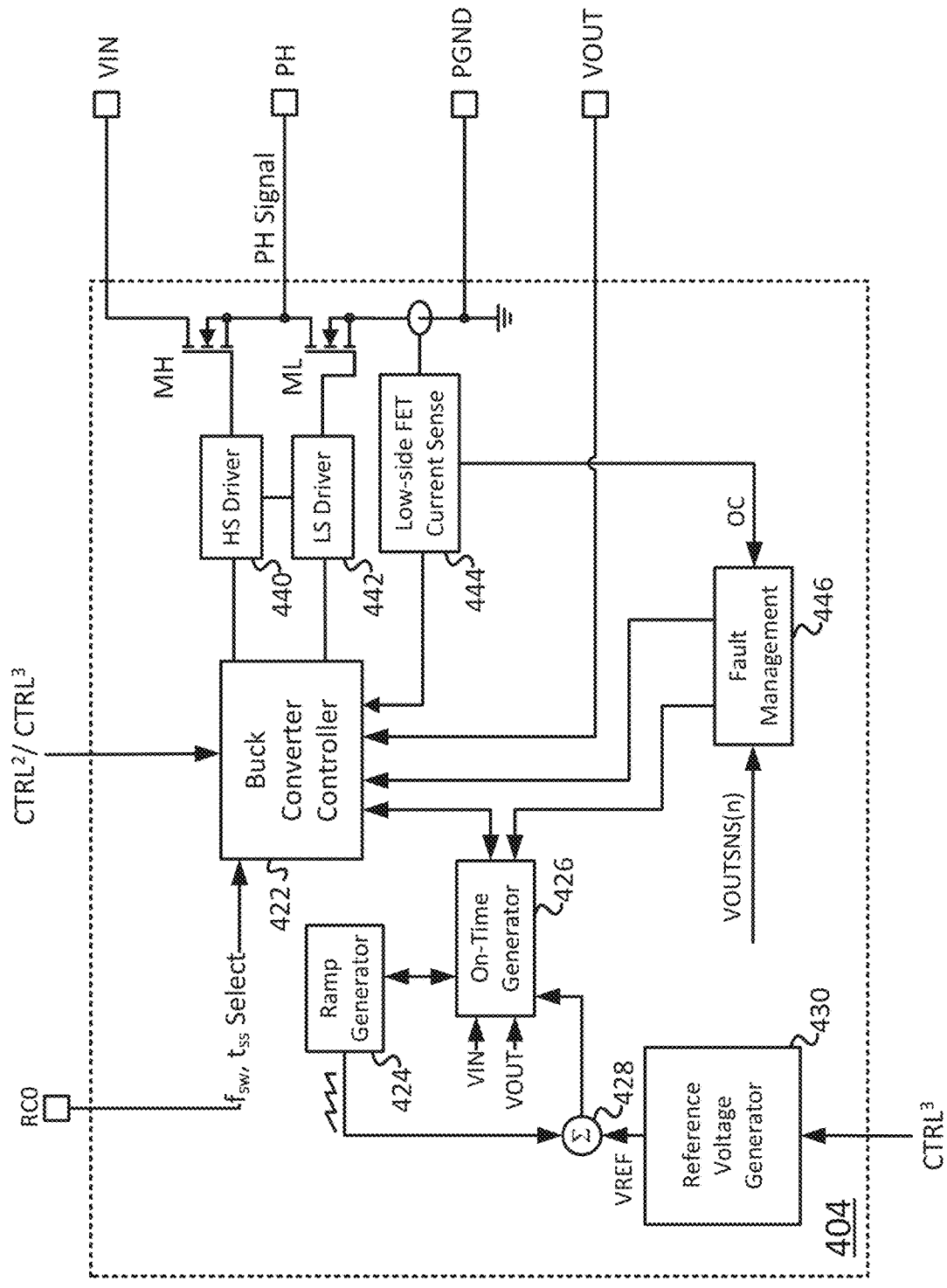
FIG. 4B is a simplified schematic of a circuit providing select details of the DC-to-DC power converter circuit included in the configurable integrated power delivery module shown in FIG. 4A, in accordance with some embodiments.

FIG. 4B is a simplified schematic of a circuit providing select details of the DC-to-DC power converter circuit 404 included in the circuit shown in FIG. 4A, in accordance with some embodiments. As shown, the DC-to-DC power converter circuit 404 includes a buck converter controller 422, a ramp-generator circuit 424, an on-time generator circuit 426, a signal summation circuit 428, a reference voltage generator circuit 430, a high-side ("HS") gate driver circuit 440 for a high-side switch MH, a low-side ("LS") gate driver circuit 442 for a low-side switch ML, a low-side FET current sense circuit 444, and a fault management circuit 446, connected as shown. Also shown are the previously introduced nodes RCO, VIN, PH, PGND, and VOUT, as well as signals $CTRL^3$, OC, PH Signal, VREF, VIN, VOUT, and "fsw, $t^{ss}$ Select".

The reference voltage generator 430 is operable to receive the control signal $CTR^3$ from the PD controller circuit 406 shown in FIG. 4A to generate a reference voltage level VREF for configuring a desired VBUS output voltage based on a negotiated amount of power, voltage, and/or current to be delivered to a sink device connected thereto. The PD controller is additionally operable to adjust the reference voltage level VREF in response to the digital representation ISNS(s) of a sensed output current generated by the DC-to-DC power converter circuit 404, the digital representation VOUTSNS(n) of a sensed output voltage generated by the DC-to-DC power converter circuit 404, and/or the digital representation VBUSV(n) of a sensed USB bus voltage generated by the DC-to-DC power converter circuit 404. The fault management circuit is operable to receive an overcurrent alert signal OC, the digital representation of the output voltage VOUTSNS(n), as well as other signals, such as an indication that the input voltage is undervoltage (not shown) to halt or adjust the operation of the DC-to-DC power converter 404.

The buck converter controller circuit 422 is operable to receive the control signal $CTR^2$ from the module controller 402 and/or the control signal $CTRL^3$ from the PD controller circuit 406 shown in FIG. 4A to change operating parameters and other configuration settings. For example, if the PD controller 406 determines that no sink device is connected to the integrated PD module 320, the DC-to-DC power converter circuit 404 may be placed in a low-power mode. In low-power mode, some or all switching signals of the DC-to-DC power converter 404 (e.g., of the ramp-generator circuit 424, and of the switches MH and ML) may be disabled to conserve power. Additionally, the buck converter controller circuit 422 is operable to receive configuration settings from node RCO that include a maximum switching frequency fs, and soft start time tss, as well as configuration settings from the module controller 402 and/or the PD controller 406.

As compared to conventional solutions, the DC-to-DC power converter 404 is configurable on a per-port basis of a multi-port converter and the configuration settings may be updated on an ongoing basis as operational conditions change.

Figure 5:
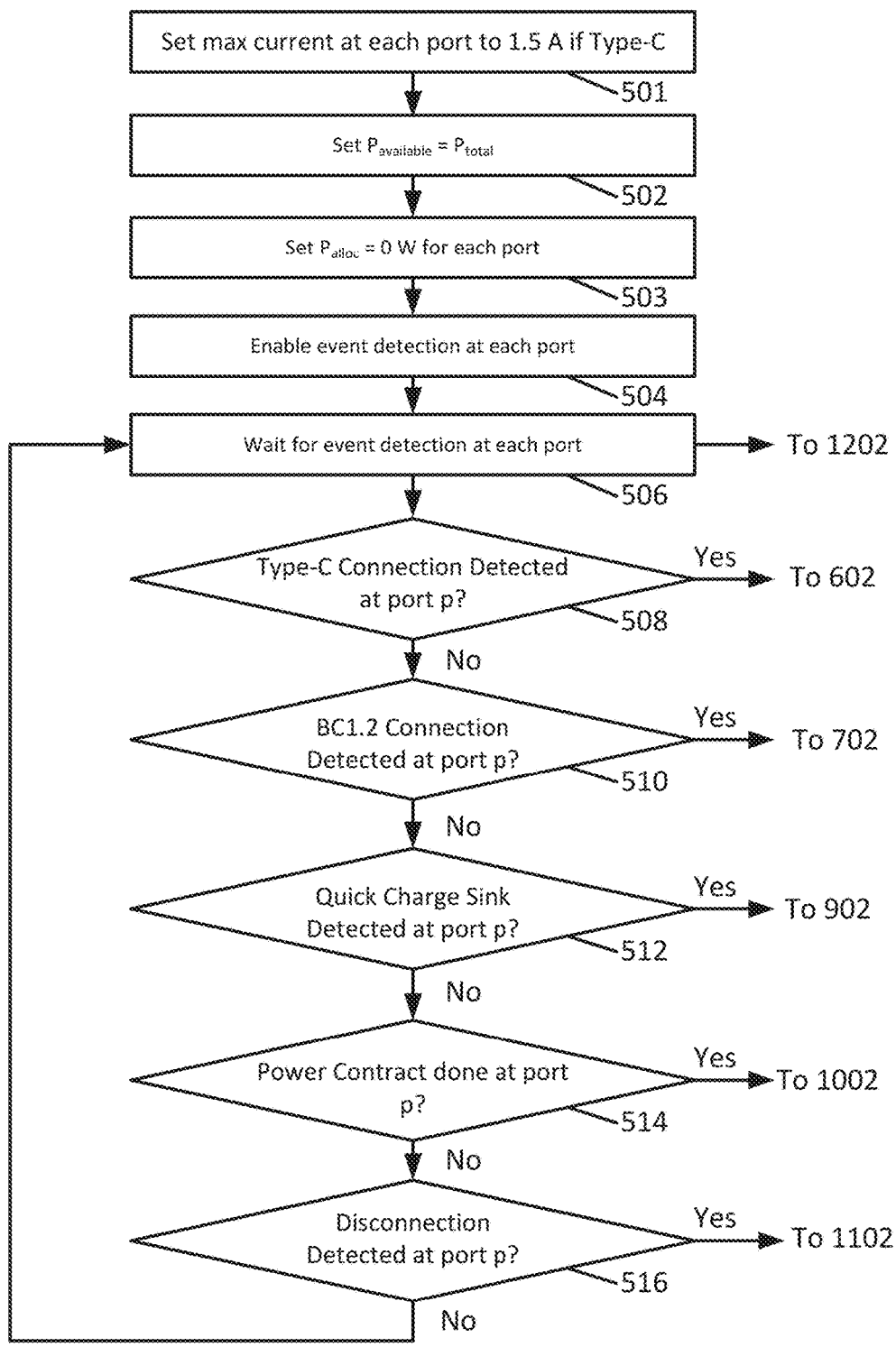

FIG. 5 provides a portion of a simplified example process 500 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

At step 501, a maximum current for each port (i.e., p through q) of the multi-port charger 201 is set by the integrated PD modules 220p-q to be 1.5 A if a Type-C standard is used for those ports. In some embodiments, one of the integrated PD modules 220p-q acts as a master controller, and each of the remaining integrated PD modules 220p-q acts as a respective slave controller. Thus, in such embodiments, the master integrated PD module commands the slave integrated PD modules to perform each of the steps described herein. By comparison, some conventional multi-port chargers rely on a single policy controller circuit that provides power delivery settings to each power delivery module thereof.

At step 502, a maximum available power $P_{available}$ that remains to be distributed to all ports of the multi-port charger 201 is set to a total allowable power Ptotal for the multi-port charger 201 (e.g., as specified by programmable configurations stored at the memory block 408 shown in FIG. 4A). For example, if the maximum available power $P_{available}$ is equal to 15 W, 15 W may be distributed between the integrated PD modules 220p-q of the multi-port charger 201. In some embodiments, such distribution may be based on a fixed or changing priority of the ports and/or the connected sink devices. The priority may advantageously be configured at the time of manufacturing (e.g., based on a configuration resistor), may be programmatically configured during operation of the multi-port charger 201 (e.g., a programmed configuration setting may assign a particular port a greater priority), or may be based on a device identifier of a connected sink device (e.g., a user may configure the multi-port charger such that their phone always has a higher priority for charging as compared to a priority assigned to charging wireless headphones). Additionally, port priority may be updated automatically during the operation of the multi-port charger based on the status of connected sink devices as well as other factors, such as changing battery charge levels of respective batteries of the sink devices, port temperatures, a powered status of the connected sink devices (e.g., a sink device that is powered on may receive a higher power allocation as compared to a sink device that is off and is merely being recharged), or other status.

For example, port p may be allocated a power output of $p_{alloc}^{p}=15$ W, and port q may be allocated a power output of $p_{alloc}^{q}=0$ W. Or, port p may be allocated a power output of $p_{alloc}^{p}=10$ W, and port q may be allocated a power output of $p_{alloc}^{q}=5$ W. Or, port p may be allocated a power output of $p_{alloc}^{p}=7.5$ W, and port q may be allocated a power output of $p_{alloc}^{q}=7.5$ W, and so on. This adaptive allocation occurs continually (e.g., every 5 s, 10 s, 15 s, or at another appropriate update rate) as the power requirements, status, and/or states of sink devices connected to the multi-port charger 201 change. For example, if two sink devices having completely drained batteries are connected to the multi-port charger 201, a first sink device connected to the master integrated PD module will initially receive a maximum allocated power and a second sink device connected to a slave integrated PD module will initially receive a minimum allocated power. As the first sink device charges, the power required by that sink device will decrease. As the power required by the first sink device decreases, the integrated PD modules of the multi-port charger 201 adaptively increase the power delivered to the second sink device and decrease the power delivered to the first sink device. In some embodiments, $P_{available}$ is stored at a master integrated PD module of the multi-port charger 201. In other embodiments, $P_{available}$ is stored at each integrated PD module of the multi-port charger 201.

At step 503, the total power allocated to each port p-q of the multi-port charger 201 is initialized to 0 W. At step 504, USB event detection is enabled at each port p-q of the multi-port charger 201. At step 506, each integrated PD module of the multi-port charger 201 waits for event detection at the port that corresponds to that integrated PD module. Flow may continue to step 508 or step 1202 (shown in FIG. 12) based on which event was determined to have occurred. The series of steps 508 through 516 may be performed in series or in parallel with the series of steps 1202 through 1214 shown in FIG. 12.

Upon detecting a USB event at one or more ports at step 506, the steps that follow are described with reference to USB events detected specifically at port p of the multi-port charger 201 using the integrated PD module 220p for simplicity. However, similar, or the same steps are followed for USB events detected at any of the other ports p-q of the multi-port charger 201.

Figure 6:
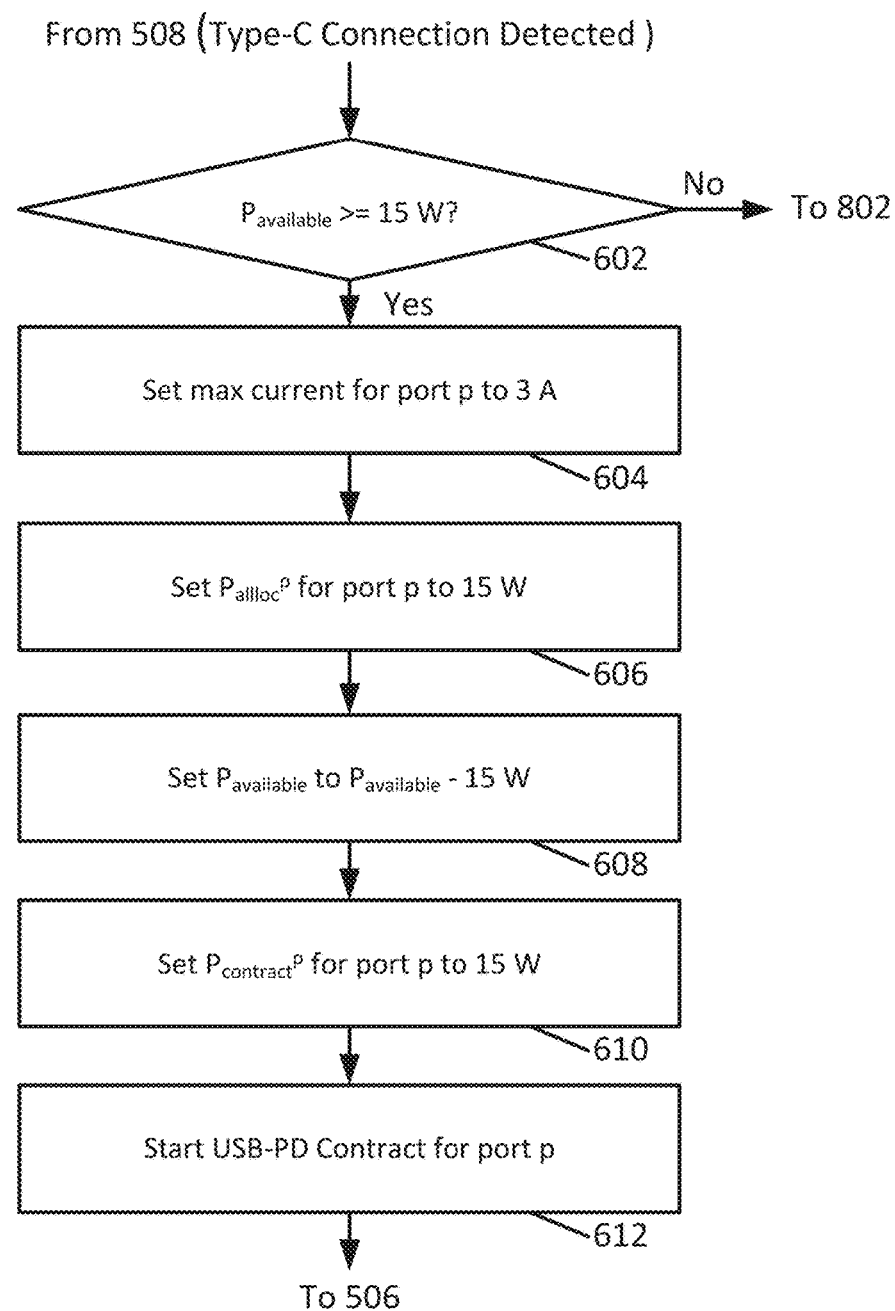

At step 508, if a Type-C connection was detected at port p, flow of the process 500 continues to step 602 shown in FIG. 6. Otherwise, flow continues to step 510. At step 510, if a USB Standard BC1.2 (USB Battery Charging version 1.2) connection was detected at port p, flow of the process continues to step 702 shown in FIG. 7. Otherwise, flow continues to step 512. At step 512, if a quick charge sink connection was detected at port p, flow of the process continues to step 902 shown in FIG. 9. Otherwise, flow continues to step 514. At step 514, if power contract negotiation is complete, in accordance with the USB-PD standard, flow continues to step 1002 shown in FIG. 10. Otherwise, flow continues to step 516. At step 516, if a sink device disconnection was detected at port p, flow continues to step 1102 shown in FIG. 11. Otherwise, flow returns to step 506.

FIG. 6 provides a portion of a simplified example process 600 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 602 of the process 600 continues from step 508 shown in FIG. 5 and is performed in response to a determination at step 508 that a Type-C connection was detected at port p. At step 602, if it is determined by negotiating between the module controllers 402 of the integrated PD modules 220p-q of the multi-port charger 201 using the digital communication bus Comm that the maximum available power $P_{available}$ that remains to be distributed between the ports of the multi-port charger 201 is greater than or equal to a target amount of power (e.g., 15 W), flow continues to step 604. Otherwise, flow continues to step 802 shown in FIG. 8.

At step 604, a maximum current for port p is set to 3 A by configuring the programmatically controlled termination resistors 412 and signal multiplexing circuit 414, using the PD controller 406 via the control signal $CTRL^4$, to values indicative of Rp 3.0 (e.g., about 10 k Ohms), per the USB-PD standard, and updating a setting of the DC-to-DC power converter 404 if needed). At step 606, the target allocated power $P_{alloc}^{p}$ for port p is set to 15 W. As such, port p of the multi-port charger 201 will deliver up to, but no more than, 15 W of power to a sink device connected to port p of the multi-port charger 201 and a setting of the DC-to-DC power converter 404 is updated accordingly if needed. At step 608, because 15 W of power has been allocated to port p, the maximum available power $P_{available}$ of the multi-port charger 201 that remains to be distributed between the ports thereof is reduced by 15 W. The adjustment in maximum available power $P_{available}$ is communicated to one or more other integrated PD modules 220p-q by the module controller 402 via the digital communication bus Comm. At step 610, the USB-PD contract $P_{contract}^{p}$ for port p is set to 15 W, in accordance with the USB-PD standard. At step 612, USB-PD contract negotiation for port p is initiated by the integrated PD module in accordance with the USB-PD standard. Flow of the process then returns to step 506 shown in FIG. 5.

Figure 7:
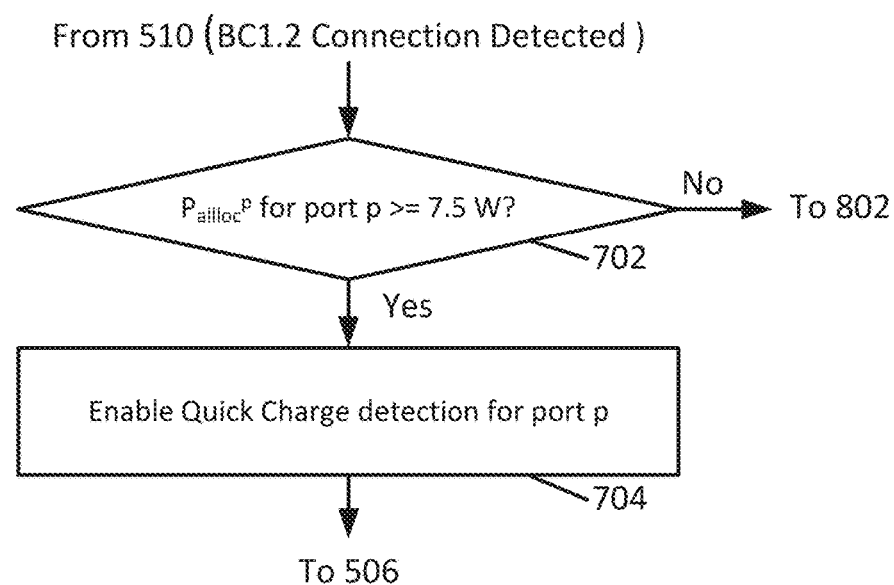

FIG. 7 provides a portion of a simplified example process 700 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 702 of the process 700 continues from step 510 shown in FIG. 5 and is conducted in response to a determination at step 510 that a BC1.2 connection was detected at port p. At step 702, if it is determined that the power $P_{alloc}^p$ allocated to port p of the multi-port charger 201 (i.e., via communication between the integrated PD modules thereof using the digital communication bus Comm) is greater than or equal to a target amount of power (e.g., 7.5 W), flow of the process 700 continues to step 704. Otherwise, flow continues to step 802 shown in FIG. 8. At step 704, quick charge detection is enabled for port p of the multi-port charger 201. Flow of the process then continues back to step 506 shown in FIG. 5.

Figure 8:
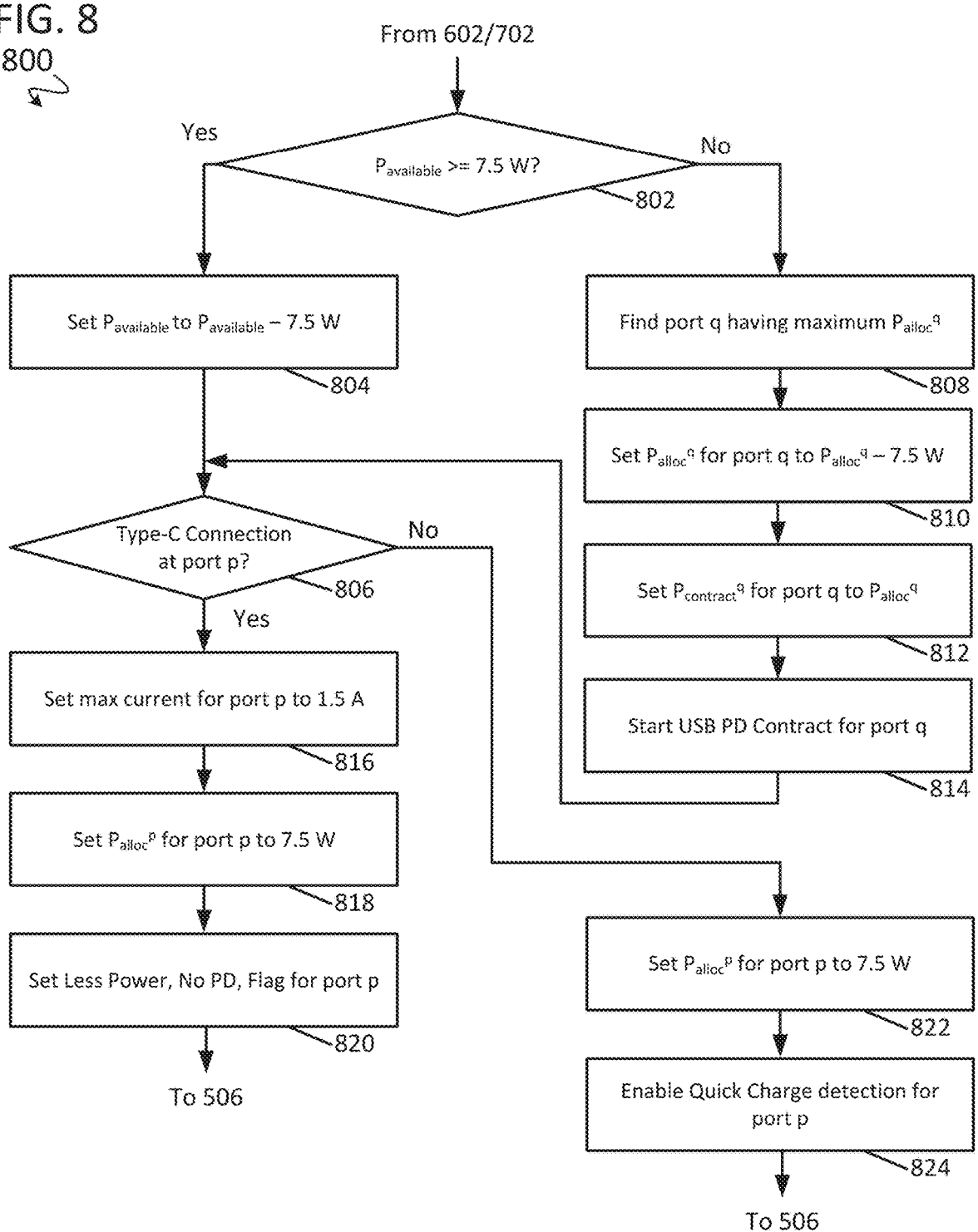

FIG. 8 provides a portion of a simplified example process 800 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 802 of the process 800 continues from either step 602 shown in FIG. 6, or from step 702 shown in FIG. 7. At step 802, if it is determined by negotiating between the module controllers 402 of the integrated PD modules 220p-q of the multi-port charger 201 using the digital communication bus Comm that the maximum available power $P_{available}$ of the multi-port charger 201 that remains to be distributed between the integrated PD modules thereof is greater than or equal to a target amount of power (e.g., 7.5 W), flow of the process 800 continues to step 804. At step 804, the maximum available power $P_{available}$ of the multi-port charger 201 that remains to be distributed to ports thereof is reduced by 7.5 W. The adjustment in maximum available power $P_{available}$ is communicated to one or more other integrated PD modules 220p-q by the module controller 402 via the digital communication bus Comm. At step 806, if it is determined that a USB Type-C connection was detected at port p, flow continues to step 816. At step 816, a maximum current for port p is programmatically set to 1.5 A by configuring the programmatically controlled termination resistors 412 and signal multiplexing circuit 414, using the PD controller 406 via the control signal $CTRL^4$, to values indicative of Rp 1.5 (e.g., about 22 k Ohms), per the USB-PD standard. Conventional solutions may use fixed resistor termination resistor values, designated in the USB standard as Rp, which determine a maximum current-carrying capability of a power source. As disclosed herein, the PD controller 406 is operable to adaptively adjust, by controlling the DC-to-DC power converter, how much current can be provided to a sink device by the integrated PD module.

At step 818, the target allocated power $P_{alloc}^p$ for port p is set to 7.5 W. At step 820, several flags are set by the PD controller 406 for port p, including a Less Power Flag and a No PD Flag, in accordance with the USB-PD standard. These flags are asserted when the power requested by a sink device cannot be supplied by the port associated with that sink device (e.g., not enough power has been allocated to that port). The asserted flags indicate to the multi-port charger 201 that more power should be supplied to the sink device as more power becomes available. Flow then returns to step 506 shown in FIG. 5.

If it was determined at step 802 that $P_{available}$ is not greater than or equal to (i.e., is less than) 7.5 W, flow of the process 800 continues to step 808 to advantageously reduce power allocated to another port of the multi-port charger 201. At step 808, the integrated PD modules of the multi-port charger 201 communicate between themselves using module controllers 402 thereof via the digital communication bus Comm to identify a port of the multi-port charger 201, (e.g., port q), that currently has the maximum allocated power, e.g., $P_{alloc}^q$. That is, in this example, port q has the current maximum allocated power. At step 810, the allocated power $P_{alloc}^q$ for port q is reduced by 7.5 W. At step 812, the USB-PD contract $P_{contract}^q$ for port q is set to $P_{alloc}^q$. At step 814, USB-PD contract negotiation for port q is initiated by the integrated PD module associated with port q (e.g., the integrated PD module 220q), in accordance with the USB-PD standard. Flow of the process 800 then continues to step 806 which was described above.

If it was determined at step 806 that the connection at port p is not USB Type-C, flow continues to step 822. At step 822, the allocated power $P_{alloc}^p$ for port p is set to 7.5 W. At step 824, quick charge detection is enabled for port p. Flow then returns to step 506 shown in FIG. 5.

Figure 9:
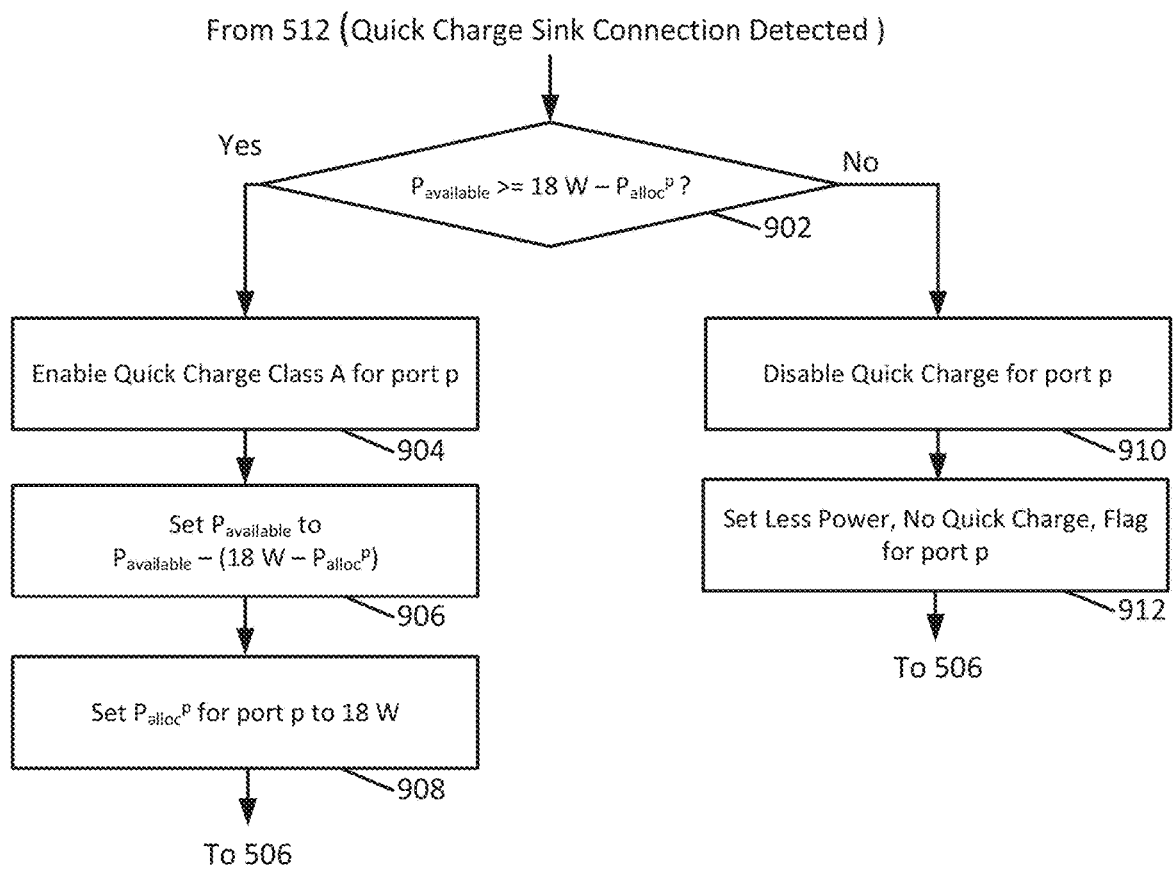

FIG. 9 provides a portion of a simplified example process 900 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 902 of the process 900 continues from step 512 shown in FIG. 5 and is conducted in response to a determination at step 512 that a USB quick charge sink device connection was detected at port p. If it is determined by negotiating between the module controllers 402 of the integrated PD modules 220p-q of the multi-port charger 201 using the digital communication bus Comm that the maximum available power $P_{available}$ of the multi-port charger 201 that remains to be distributed between the ports thereof is greater than or equal to a target amount of power (e.g., 18 W) minus the power $P_{alloc}^p$ currently allocated to port p, flow of the process 900 continues to step 904. At step 904, USB quick charge class A mode is enabled for port p, in accordance with the USB-PD standard. At step 906, the maximum available power $P_{available}$ of the multi-port charger 201 that remains to be distributed between the ports thereof is reduced by 18 W and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 908, the target amount of power $P_{alloc}^p$ allocated to port p is updated to 18 W. Flow then returns to step 506 shown in FIG. 5.

If it was determined at step 902 that the maximum available power $P_{available}$ of the multi-port charger 201 that remains to be distributed to ports thereof is not greater than or equal to (i.e., is less than) 18 W minus the power $P_{alloc}^p$ currently allocated to port p, flow of the process 900 continues to step 910. At step 910, USB quick charge mode is disabled for port p, in accordance with the USB-PD standard. Additionally, at step 912, several flags are set for port p, including a Set Less Power and No Quick Charge, in accordance with the USB-PD standard. Flow then returns to step 506 shown in FIG. 5.

Figure 10:
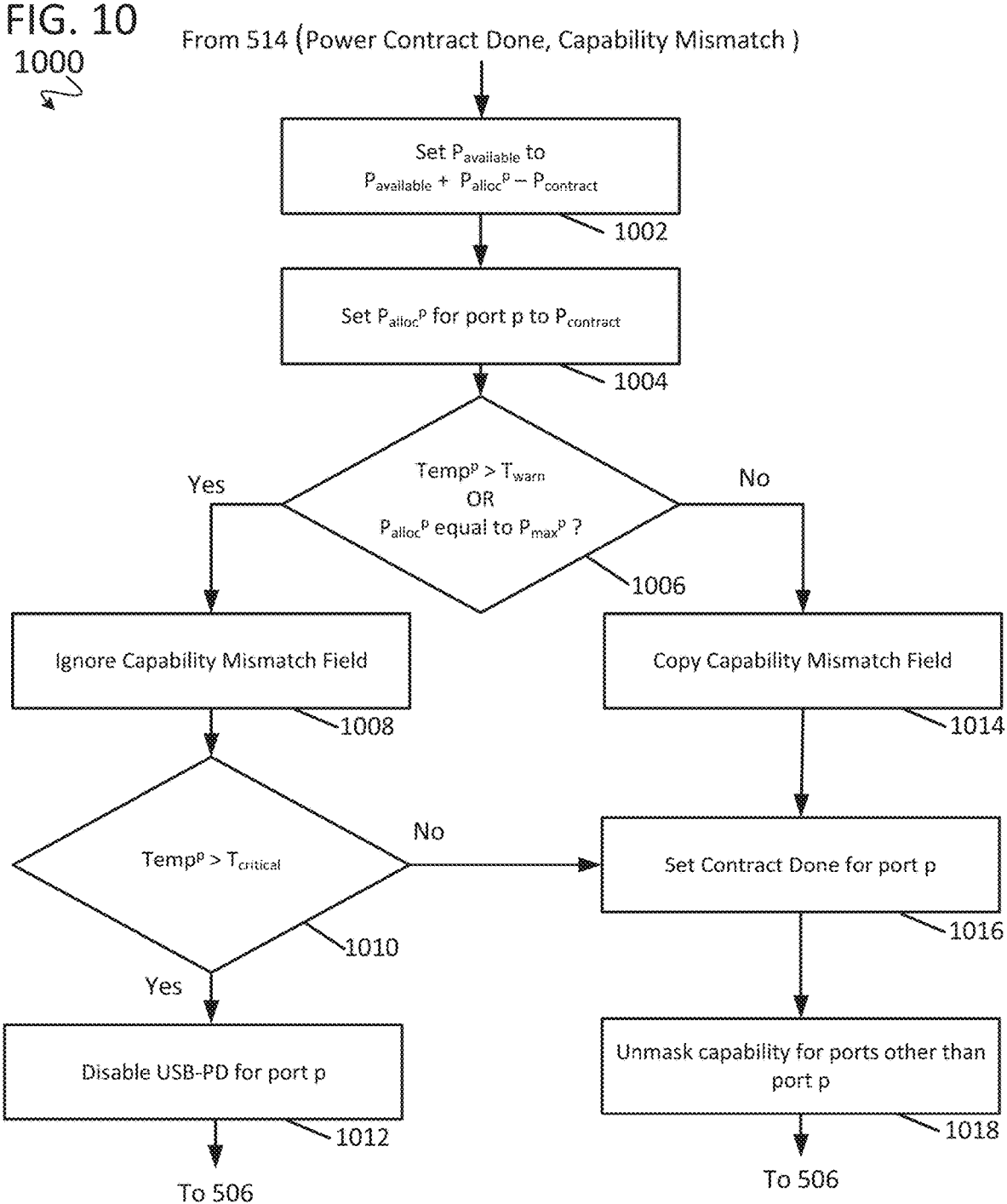

FIG. 10 provides a portion of a simplified example process 1000 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 1002 of the process 1000 continues from step 514 shown in FIG. 5 and is conducted in response to a determination at step 514 that completion of a USB power contract negotiation, in accordance with the USB-PD standard, was detected at port p. Additionally, USB capability mismatch for the sink device at port p may have occurred. USB capability mismatch occurs when a sink device cannot satisfy its power requirements from the capabilities offered by the source (i.e., the power delivered by port p). At step 1002, the maximum available power $P_{available}$ of the multi-port charger 201 that remains to be distributed between the ports thereof is reduced by the negotiated power $P_{contract}$, and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 1004, the amount of power $P_{alloc}^p$ allocated to port p is updated to $P_{contract}$.

At step 1006, if it is determined if a counter $Temp^p$ of excess temperature events for port p has exceeded a first excess temperature event count threshold $T_{warn}$, or that the power $P_{alloc}^p$ allocated to port p is already equal to a maximum amount of power $P_{max}^p$ that the integrated PD module at port p is able to deliver, flow of the process continues to step 1008. USB temperature event detection is described in more detail below with reference to FIG. 1200.

At step 1008, because the counter $Temp^p$ of excess temperature events was greater than the first excess temperature event count threshold $T_{warn}$, the USB Capability Mismatch flag for the sink device at port p is ignored by the integrated PD module associated with port p. Flow continues to step 1010, where it is determined if the counter $Temp^p$ of excess temperature events is greater than a second excess temperature event count threshold $T_{critical}$. If the counter $Temp^p$ of excess temperature events is greater than a second excess temperature event count threshold $T_{critical}$, at step 1012, USB-PD is disabled for port p. Flow then returns to step 506 shown in FIG. 5.

If it was determined at step 1006 that the counter $Temp^p$ of excess temperature events for port p had not exceeded the first excess temperature event count threshold $T_{warn}$, and that the power $P_{alloc}^p$ allocated to port p was not already equal to the maximum amount of power $P_{max}^p$ that the integrated PD module at port p is able to deliver, flow of the process continues to step 1014. At step 1014, the USB capability mismatch field is copied by the associated integrated PD module (i.e., it is not ignored by the integrated PD module associated with port p). At step 1016, a flag indicating that the PD contract negotiation at port p is complete is set at the associated integrated PD module. Flow additionally continues to step 1016 from step 1010, described above, if it was determined at step 1010 that the counter $Temp^p$ of excess temperature events is not greater than a second excess temperature event count threshold $T_{critical}$. At step 1018, capabilities for ports of the multi-port charger 201 other than port p are unmasked by the integrated PD modules of the multi-port charger 201. Flow of the process then returns to step 506 shown in FIG. 5.

FIG. 11 provides a portion of a simplified example process 1100 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 1102 of the process 1100 continues from step 516 shown in FIG. 5 and is performed in response to a determination at step 516 that a USB sink device disconnection has been detected at port p. At step 1102, the amount of power $P_{alloc}^p$ that was previously allocated to port p is added back to the maximum available power $P_{available}$ that remains to be distributed between the ports thereof. The adjustment in maximum available power $P_{available}$ is communicated to one or more other integrated PD modules 220p-q by the module controller 402 via the digital communication bus Comm. At step 1104, the amount of power $P_{alloc}^p$ allocated to port p is updated to 0 W (because no sink device is connected at port p). At step 1106, a maximum current for port p is programmatically set to 1.5 A by configuring the programmatically controlled termination resistors 412 and signal multiplexing circuit 414, using the PD controller 406 via the control signal $CTRL^4$, to values indicative of Rp 1.5 (e.g., about 22 k Ohms), per the USB-PD standard if port p is configured as USB Type-C. At step 1108, any status flags and counters that were associated with the sink device previously connected to port p, such as the counter $Temp^p$ of excess temperature events, are cleared by the integrated PD module associated with port p. At step 1110, USB capability mismatch is unmasked, per the USB-PD standard, for ports other than port p.

In some embodiments, at step 1112, the integrated PD module associated with port p is advantageously operable to place the DC-to-DC power converter therein into a low-power consumption mode until a sink device is connected to port p. For example, the DC-to-DC power converter may be placed in a standby mode in which switching signals are disabled, thereby increasing an overall power efficiency of the multi-port charger 201 as compared to chargers that do enter a low-power mode. Flow of the process then returns to step 506 shown in FIG. 5.

Figure 12:
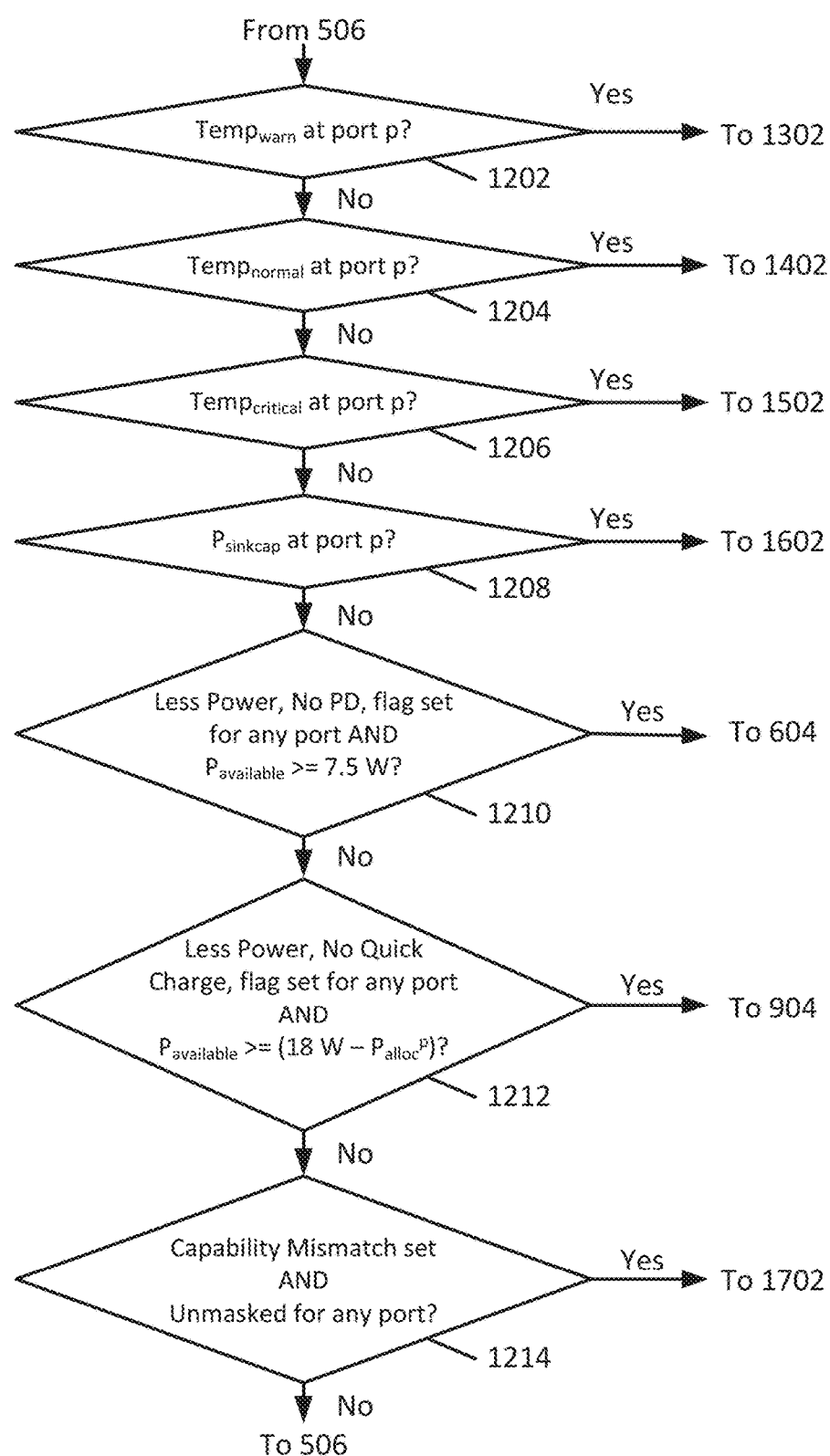

FIG. 12 provides a portion of a simplified example process 1200 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

The steps of process 1200 continue from step 506 shown in FIG. 5. At step 1202, if an excess temperature warning event $Temp_{warn}$ was detected at port p by an associated integrated PD module, flow continues to step 1302, shown in FIG. 13. Otherwise, flow continues to step 1204. At step 1204, if a normal temperature event $Temp_{normal}$ was detected at port p by an associated integrated PD module, flow continues to step 1402, shown in FIG. 14. Otherwise, flow continues to step 1206. At step 1206, if a critical temperature event $Temp_{critical}$ was detected at port p by an associated integrated PD module, flow continues to step 1502, shown in FIG. 15. Otherwise, flow continues to step 1208. At step 1208, if a sink capabilities event $P_{sinkcap}$ was detected at port p by an associated integrated PD module, flow continues to step 1602, shown in FIG. 16. Otherwise, flow continues to step 1210.

At step 1210, if it is determined, (e.g., using the controller modules thereof via the digital communication bus Comm), that a USB Less Power, No PD, flag is set for any port of the multi-port charger 201, and that the maximum available power $P_{available}$ that remains to be distributed between the ports thereof is greater than or equal to 7.5 W, flow returns to step 604 shown in FIG. 6. Otherwise, flow continues to step 1212.

At step 1212, if it is determined, (e.g., using the controller modules thereof via the digital communication bus Comm), that a USB Less Power, No Quick Charge, flag is set for any port of the multi-port charger 201 and that the maximum available power $P_{available}$ that remains to be distributed between the ports thereof is greater than or equal to 18 W minus the amount of power $P_{alloc}^p$ allocated to port p, flow returns to step 904 of FIG. 9. Otherwise, flow continues to step 1214.

Figure 17:
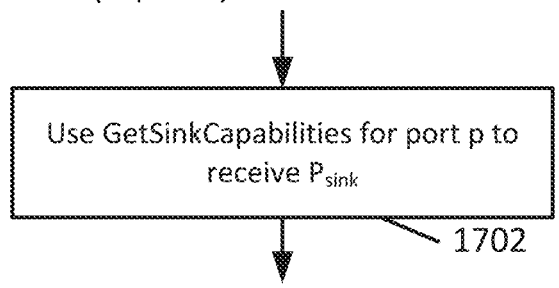

At step 1214, if it is determined, (e.g., using the controller modules thereof via the digital communication bus Comm), that a USB Capability Mismatch flag is set for port p and that capability mismatch is unmasked for any port of the multi-port charger 201, flow continues to step 1702 shown in FIG. 17. Otherwise, flow returns to step 506 shown in FIG. 5.

Figure 13:
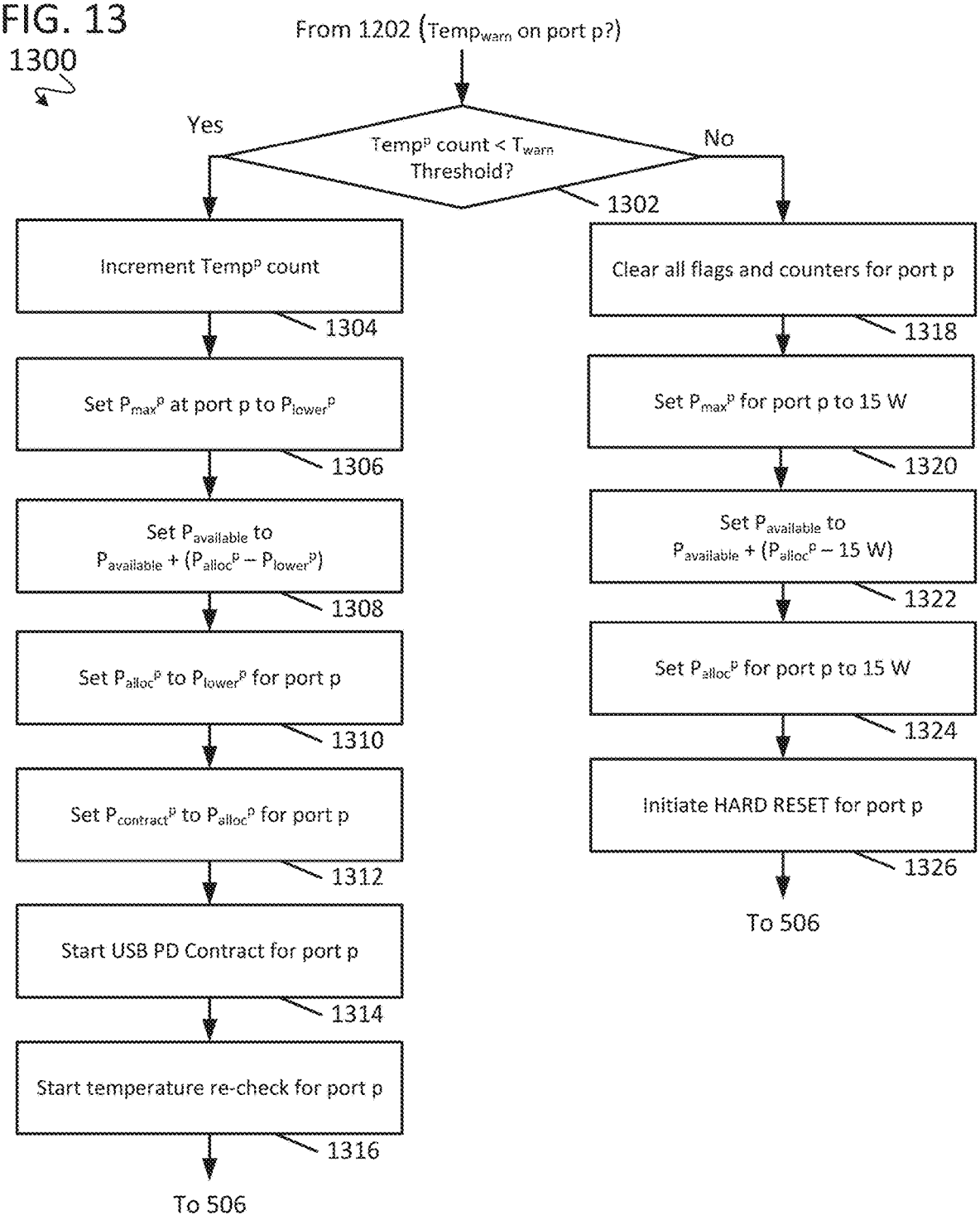

FIG. 13 provides a portion of a simplified example process 1300 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 1302 of the process 1300 continues from step 1202 shown in FIG. 12 and is conducted in response to a determination that an excess temperature warning event $Temp_{warn}$ was detected at port p by an associated integrated PD module. At step 1302, if it is determined that the counter $Temp^p$ of excess temperature events at port p is less than the first excess temperature event count threshold $T_{warn}$, flow of the process continues to step 1304. At step 1304, the counter $Temp^p$ of excess temperature events at port p is incremented. At step 1306, the maximum amount of power $P_{max}^p$ that the integrated PD module at port p is permitted to deliver is reduced to a lower power level $P_{lower}^p$. At step 1308, the maximum available power $P_{available}$ of the multi-port charger 201 that remains to be distributed between ports thereof is reduced by the new lower power level $P_{lower}^p$ and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 1310, the amount of power $P_{alloc}^p$ allocated to port p is updated to $P_{lower}^p$. At step 1312, the USB-PD contract $P_{contract}^p$ for port p is set to $P_{alloc}^p$. At step 1314, USB-PD contract negotiation for port p is initiated by the integrated PD module associated with port p, in accordance with the USB-PD standard. At step 1316, the integrated PD module associated with port p initiates a temperature re-check process for the sink device connected to port p. Flow of the process then returns to step 506 shown in FIG. 5.

If it was determined at step 1302 that the counter $Temp^p$ of excess temperature events at port p is not less than (i.e., is greater than or equal to) the first excess temperature event count threshold $T_{warn}$, flow of the process continues to step 1318. At step 1318, all flags and counters associated with port p are cleared. At step 1320, the maximum amount of power $P_{max}^p$ that the integrated PD module at port p is permitted to deliver is set to 15 W. At step 1322, the maximum available power $P_{available}$ of the multi-port charger 201 that remains to be distributed between the ports thereof is reduced by 15 W, and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 1324, the amount of power $P_{alloc}^p$ allocated to port p is updated to 15 W. At step 1326, a hard reset, in accordance with the USB-PD standard, is initiated by the integrated PD module associated with port p. Flow of the process then returns to step 506 shown in FIG. 5.

Figure 14:
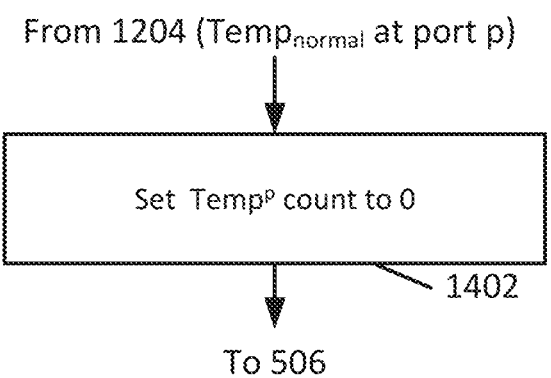

FIG. 14 provides a portion of a simplified example process 1400 for adaptive power-sharing using the multi-port charger 201 shown in FIG. 2, in accordance with some embodiments. The particular step, the order in which the step is performed, and the combination of the step with other steps disclosed herein are shown for illustrative and explanatory purposes only. Other embodiments can implement different particular steps, orders of steps, and combinations of steps to achieve similar functions or results.

Step 1402 of the process 1400 continues from step 1204 shown in FIG. 12 and is conducted in response to a determination that a normal temperature event $Temp_{normal}$ was detected at port p by an associated integrated PD module. Accordingly, at step 1402, the counter $Temp^p$ of excess temperature events at port p is reset to 0. Flow of the process then returns to step 506 shown in FIG. 5.

Figure 15:
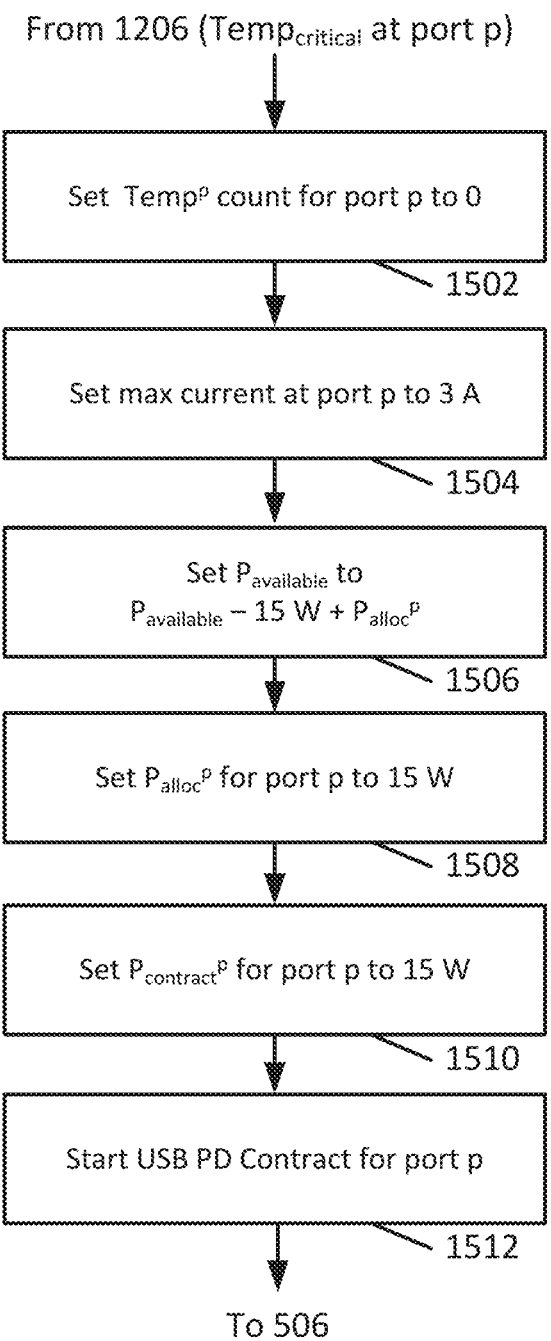

FIG. 15 provides a portion of a simplified example process 1500 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 1502 of the process 1500 continues from step 1206 shown in FIG. 12 and is conducted in response to a determination that a critical excess temperature event $Temp_{critical}$ was detected at port p by an associated integrated PD module. At step 1502, the counter $Temp^p$ of excess temperature events at port p is reset to 0. At step 1504, a maximum current for port p is set to 3 A by configuring the programmatically controlled termination resistors 412 and signal multiplexing circuit 414, using the PD controller 406 via the control signal $CTRL^4$, to values indicative of Rp 3.0 (e.g., about 10 k Ohms), per the USB-PD standard. At step 1506, the maximum available power $P_{available}$ of the multi-port charger 201 that remains to be distributed between the ports thereof is reduced by 15 W and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 1508, the amount of power $P_{alloc}^p$ allocated to port p is updated to 15 W. At step 1510, the USB-PD contract $P_{contract}^p$ for port p is set to 15 W. At step 1512, USB-PD contract negotiation for port p is initiated by the integrated PD module associated with port p, in accordance with the USB-PD standard. Flow of the process then returns to step 506 shown in FIG. 5.

Figure 16:
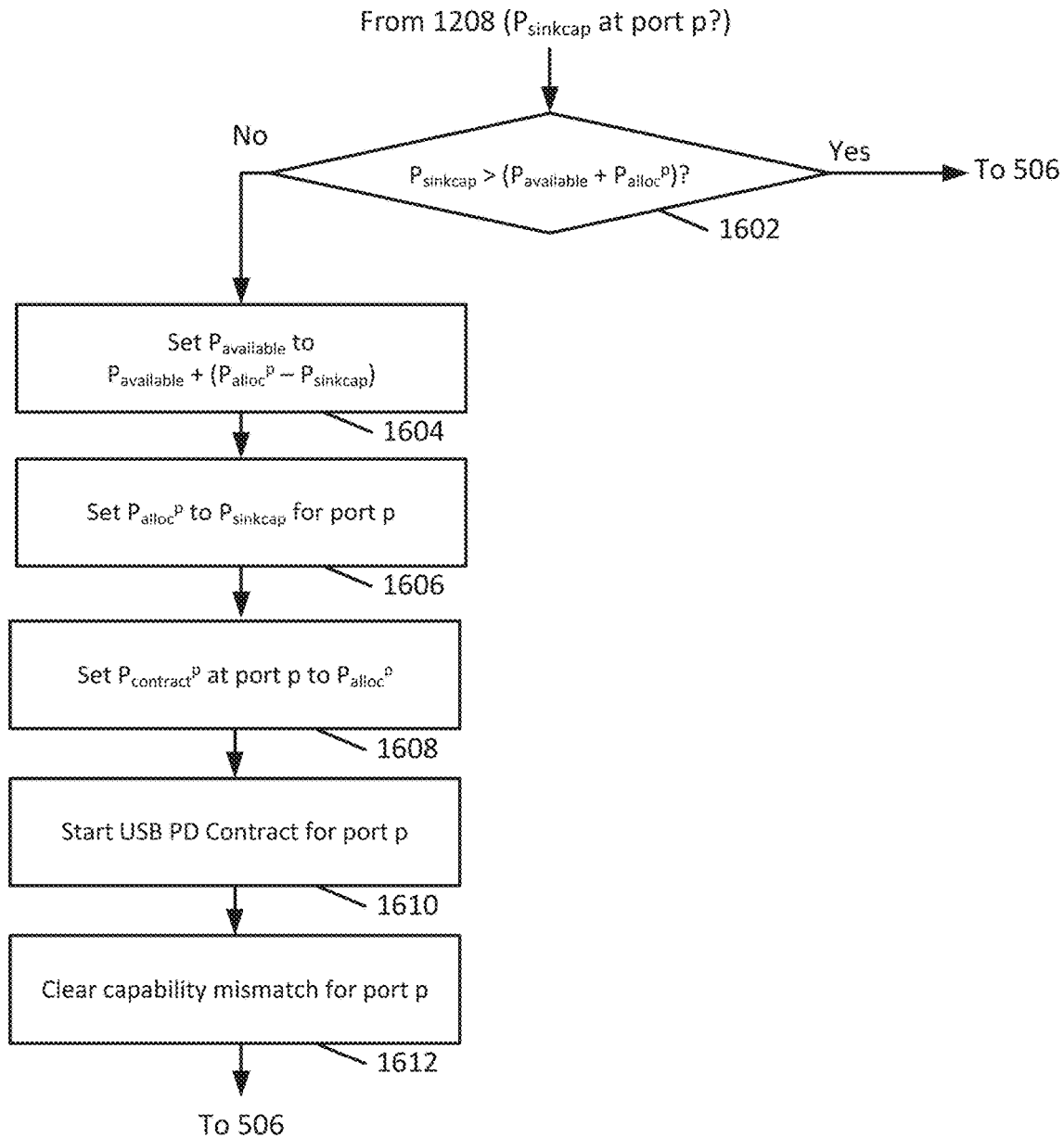

FIG. 16 provides a portion of a simplified example process 1600 for adaptive power-sharing using the multi-port charger 201 shown in FIG. 2, in accordance with some embodiments. The particular steps, the order of steps, and the combination of steps are shown for illustrative and explanatory purposes only. Other embodiments can implement different particular steps, orders of steps, and combinations of steps to achieve similar functions or results.

Step 1602 of the process 1600 continues from step 1208 shown in FIG. 12 and is conducted in response to a $P_{sinkcap}$ power event being detected at port p by the associated integrated PD module. At step 1602, if it is determined that the $P_{sinkcap}$ power is greater than the maximum available power $P_{available}$ of the multi-port charger 201 that remains to be distributed between the ports, plus the amount of power $P_{alloc}^p$ previously allocated to port p, flow returns to step 506 shown in FIG. 5. Otherwise, flow continues to step 1604. At step 1604, the maximum available power $P_{available}$ of the multi-port charger 201 that remains to be distributed between the ports thereof is reduced by the $P_{sinkcap}$ power, and the amount of power $P_{alloc}^p$ previously allocated to port p is added back to the maximum available power $P_{available}$. The adjustment in maximum available power $P_{available}$ is communicated to one or more other integrated PD modules 220p-q by the module controller 402 via the digital communication bus Comm. Accordingly, at step 1606, the amount of power $P_{alloc}^p$ allocated to port p is updated to $P_{sinkcap}$. At step 1608, the USB-PD contract $P_{contract}^p$ for port p is set to $P_{alloc}^p$. At step 1610, USB-PD contract negotiation for port p is initiated by the integrated PD module associated with port p, in accordance with the USB-PD standard. At step 1612, a Capability Mismatch flag for port p is cleared by the integrated PD module associated with port p. Flow of the process then returns to step 506 of FIG. 5.

FIG. 17 provides a portion of a simplified example process 1700 for adaptive power-sharing using the multi-port charger 201 shown in FIG. 2, in accordance with some embodiments. The particular step, the order in which the step is performed, and the combination of the step with other steps disclosed herein are shown for illustrative and explanatory purposes only. Other embodiments can implement different particular steps, orders of steps, and combinations of steps to achieve similar functions or results.

Step 1702 of the process 1700 continues from step 1214 shown in FIG. 12 and is conducted in response to determining by the integrated PD module associated with port p that a Capability Mismatch flag has been set for port p and that capability mismatch is unmasked for any port of the multi-port charger 201. In response, at step 1702, the integrated PD module associated with port p initiates a USB GetSinkCapabilities event for port p to receive $P_{sinkcap}$ power for the sink device connected to port p, in accordance with the USB-PD standard.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A multi-port charger, comprising:
    a first power converter that generates a DC output voltage; and
    a plurality of integrated power delivery modules electrically coupled to the first power converter;
    wherein each of the integrated power delivery modules comprises:
        a module controller;
        a power delivery controller ("PD controller") in signal communication with the module controller and which is configured to be connected to a sink device;
        a second power converter in signal communication with the module controller and the PD controller and which is configured to provide an output voltage to the sink device via a voltage bus;
        a first analog-to-digital converter (ADC) circuit in signal communication with the PD controller and the voltage bus to generate a digital representation of the output voltage provided by the second power converter to the sink device; and
        a second ADC circuit in signal communication with the PD controller and the voltage bus to provide a digital representation of an output current provided by the second power converter to the sink device.

2. The multi-port charger of claim 1, wherein:
    a first integrated power delivery module of the plurality of integrated power delivery modules is configured to determine a first target amount of power to be provided to a first sink device connected thereto by i) negotiating with the first sink device using a first PD controller of the first integrated power delivery module, and ii) negotiating with respective second module controllers of one or more second integrated power delivery modules of the plurality of integrated power delivery modules using a first module controller of the first integrated power delivery module.

3. The multi-port charger of claim 2, wherein:
    the first integrated power delivery module generates a digital representation of an actual amount of power delivered to the first sink device by the second power converter using the digital representation of the output voltage and the digital representation of an output current; and
    the first integrated power delivery module is configured to communicate the digital representation of the actual amount of power delivered to the first sink device to the second integrated power delivery modules using the first module controller to update an available amount of power that can be delivered by the multi-port charger.

4. The multi-port charger of claim 2, wherein:
    the first integrated power delivery module is configured to set the output voltage of the second power converter of the first integrated power delivery module in accordance with the first target amount of power via the first PD controller.

5. The multi-port charger of claim 4, wherein:
    upon determining, by the first PD controller, that the first sink device has been disconnected from the first integrated power delivery module, setting the second power converter of the first integrated power delivery module to a standby mode, the standby mode comprising disabling switching signals of the second power converter.

6. The multi-port charger of claim 2, wherein:
a first programmable configuration stored at one or more respective memory modules of the plurality of integrated power delivery modules specifies a total allowable power that may be delivered by the multi-port charger;
a second integrated power delivery module of the one or more second integrated power delivery modules is configured to negotiate a second target amount of power to be provided to a second sink device connected thereto by i) negotiating with the second sink device using a second PD controller of the second integrated power delivery module, and ii) negotiating with the first integrated power delivery module using a second module controller of the second integrated power delivery module; and
a summation of the first target amount of power and the second target amount of power is less than or equal to the total allowable power.

7. The multi-port charger of claim 6, wherein:
upon determining by the second integrated power delivery module, from the first PD controller, that a third target amount of power should be provided to the first sink device:
the second integrated power delivery module is configured to negotiate a fourth target amount of power to be provided to the second sink device connected thereto by i) negotiating with the second sink device using the second PD controller of the second integrated power delivery module, and ii) negotiating with the first integrated power delivery module using the second module controller of the second integrated power delivery module; and
a summation of the third target amount of power and the fourth target amount of power is less than or equal to the total allowable power.

8. The multi-port charger of claim 7, wherein:
each integrated power delivery module of the plurality of integrated power delivery modules comprises a respective third ADC circuit in signal communication with a respective PD controller of that integrated power delivery module and a respective temperature sensing circuit to generate a digital representation of a temperature value of that integrated power delivery module; and
the third target amount of power is based on the digital representation of the temperature value.

9. The multi-port charger of claim 7, wherein:
the third target amount of power is based on a charge level of a battery of the first sink device.

10. The multi-port charger of claim 7, wherein:
the third target amount of power is based on a priority of the first sink device as compared to the second sink device.

11. An integrated power delivery module, comprising:
a module controller;
a power delivery controller ("PD controller") in signal communication with the module controller and which is configured to be connected to a sink device;
a power converter in signal communication with the module controller and the PD controller and which is configured to receive an input voltage and to provide an output voltage to the sink device via a voltage bus;
a first analog-to-digital converter (ADC) circuit in signal communication with the PD controller and the voltage bus to generate a digital representation of the output voltage provided by the power converter to the sink device; and
a second ADC circuit in signal communication with the PD controller and the voltage bus to provide a digital representation of an output current provided by the power converter to the sink device.

12. The integrated power delivery module of claim 11, wherein:
a first integrated power delivery module of a plurality of integrated power delivery modules is configured to determine a first target amount of power to be provided to a first sink device connected thereto by i) negotiating with the first sink device using a first PD controller of the first integrated power delivery module, and ii) negotiating with respective second module controllers of one or more second integrated power delivery modules of the plurality of integrated power delivery modules using a first module controller of the first integrated power delivery module.

13. The integrated power delivery module of claim 12, wherein:
the first integrated power delivery module is configured to generate a digital representation of an actual amount of power delivered to the first sink device by the power converter using the digital representation of the output voltage and the digital representation of an output current; and
the first integrated power delivery module is configured to communicate the digital representation of the actual amount of power delivered to the first sink device to the second integrated power delivery modules using the first module controller to update an available amount of power that can be delivered by the plurality of integrated power delivery modules.

14. The integrated power delivery module of claim 12, wherein:
the first integrated power delivery module is configured to set the output voltage of a first power converter of the first integrated power delivery module in accordance with the first target amount of power via the first PD controller.

15. The integrated power delivery module of claim 14, wherein:
upon determining, by the first PD controller, that the first sink device has been disconnected from the first integrated power delivery module, setting the first power converter to a standby mode, the standby mode comprising disabling switching signals of the first power converter.

16. The integrated power delivery module of claim 12, wherein:
a first programmable configuration stored at one or more respective memory modules of the plurality of integrated power delivery modules specifies a total allowable power that may be delivered by the plurality of integrated power delivery modules;
a second integrated power delivery module of the one or more second integrated power delivery modules is configured to negotiate a second target amount of power to be provided to a second sink device connected thereto by i) negotiating with the second sink device using a second PD controller of the second integrated power delivery module, and ii) negotiating with the first integrated power delivery module using a second module controller of the second integrated power delivery module; and a summation of the first target amount of power and the second target amount of power is less than or equal to the total allowable power.

17. The integrated power delivery module of claim 16, wherein:
upon determining by the second integrated power delivery module, from the first PD controller, that a third target amount of power should be provided to the first sink device:
the second integrated power delivery module is configured to negotiate a fourth target amount of power to be provided to the second sink device connected thereto by i) negotiating with the second sink device using the second PD controller of the second integrated power delivery module, and ii) negotiating with the first integrated power delivery module using the second module controller of the second integrated power delivery module; and
a summation of the third target amount of power and the fourth target amount of power is less than or equal to the total allowable power.

18. The integrated power delivery module of claim 17, wherein:
each integrated power delivery module of the plurality of integrated power delivery modules comprises a respective third ADC circuit in signal communication with a respective PD controller of that integrated power delivery module and a respective temperature sensing circuit to generate a digital representation of a temperature value of that integrated power delivery module; and
the third target amount of power is based on the digital representation of the temperature value.

19. The integrated power delivery module of claim 17, wherein:
the third target amount of power is based on a charge level of a battery of the first sink device.

20. The integrated power delivery module of claim 17, wherein:
the third target amount of power is based on a priority of the first sink device as compared to the second sink device.

* * * * *